(12) United States Patent
Ichikawa et al.

(10) Patent No.: US 10,874,009 B2
(45) Date of Patent: Dec. 22, 2020

(54) LOAD DRIVING APPARATUS

(71) Applicant: KOITO MANUFACTURING CO., LTD., Tokyo (JP)

(72) Inventors: Tomoyuki Ichikawa, Shizuoka (JP); Toshiaki Tsuda, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 16/207,159

(22) Filed: Dec. 2, 2018

(65) Prior Publication Data

US 2019/0110345 A1  Apr. 11, 2019

Related U.S. Application Data

(63) Continuation of application No. PCT/JP2017/021338, filed on Jun. 8, 2017.

(30) Foreign Application Priority Data

Jun. 13, 2016 (JP) ................................. 2016-117065
Jul. 1, 2016 (JP) ................................. 2016-131749

(51) Int. Cl.
*H05B 45/40* (2020.01)
*H02M 3/155* (2006.01)
(Continued)

(52) U.S. Cl.
CPC ............... *H05B 45/40* (2020.01); *B60Q 1/04* (2013.01); *B60Q 11/005* (2013.01); *F21S 41/16* (2018.01);
(Continued)

(58) Field of Classification Search
None
See application file for complete search history.

(56) References Cited

U.S. PATENT DOCUMENTS 8,963,445 B2 * 2/2015 Baccarin ................ H05B 45/50
                                                            315/291
9,198,247 B2 * 11/2015 Ito .......................... H05B 45/48
(Continued)

FOREIGN PATENT DOCUMENTS

CN        1142705 A     2/1997
CN      106489232 A     3/2017
(Continued)

OTHER PUBLICATIONS

International Search Report on corresponding PCT Application No. PCT/JP2017/021338, dated Aug. 15, 2017.
(Continued)

*Primary Examiner* — Amy Cohen Johnson
*Assistant Examiner* — Srinivas Sathiraju
(74) *Attorney, Agent, or Firm* — Buchanan Ingersoll & Rooney PC

(57) ABSTRACT

A load driving apparatus receives an input voltage from a power supply, and supplies electric power to a load under processor control. The processor outputs first and second signals via first and second pins in a conjunction such that they are negated when the load is instructed to suspend operation. An output circuit supplies electric power to the load. A protection switch is provided on a driving path that extends from the power supply to the load and returns to the power supply. When the first signal is asserted (negated), a control circuit sets the output circuit to an operation state (suspension state). The control circuit turns on the protection switch on assertion of the second signal, and turns it off on negation of this signal.

14 Claims, 15 Drawing Sheets

(51) Int. Cl.
  *H05B 45/37* (2020.01)
  *H05B 45/50* (2020.01)
  *H05B 47/10* (2020.01)
  *H05B 47/105* (2020.01)
  *F21S 41/176* (2018.01)
  *F21S 41/16* (2018.01)
  *B60Q 1/04* (2006.01)
  *B60Q 11/00* (2006.01)

(52) U.S. Cl.
  CPC ........... *F21S 41/176* (2018.01); *H02M 3/155* (2013.01); *H05B 45/37* (2020.01); *H05B 45/50* (2020.01); *H05B 47/10* (2020.01); *H05B 47/105* (2020.01)

(56) References Cited

U.S. PATENT DOCUMENTS

| | | | | |
|---|---|---|---|---|
| 9,324,234 | B2* | 4/2016 | Ricci | B60W 50/0098 |
| 10,144,341 | B2* | 12/2018 | Dalal | H05B 45/50 |
| 10,391,936 | B2* | 8/2019 | Ichikawa | G01J 1/4228 |
| 10,420,196 | B2* | 9/2019 | Ichikawa | H05B 47/20 |
| 2016/0081171 | A1* | 3/2016 | Ichikawa | B60Q 11/005 315/77 |
| 2016/0099711 | A1* | 4/2016 | Uemura | H03K 17/145 315/77 |
| 2016/0156152 | A1 | 6/2016 | Ichikawa et al. | |
| 2017/0267175 | A1* | 9/2017 | Ichikawa | F21S 41/32 |
| 2018/0014395 | A1* | 1/2018 | Ichikawa | F21S 41/00 |
| 2018/0313509 | A1* | 11/2018 | Ichikawa | F21S 41/16 |
| 2018/0339642 | A1* | 11/2018 | Kikuchi | H05B 45/14 |
| 2018/0372200 | A1* | 12/2018 | Kumar | B60K 6/36 |
| 2019/0016249 | A1* | 1/2019 | Ichikawa | B60Q 1/00 |
| 2019/0092382 | A1* | 3/2019 | Kogure | B62D 5/0496 |
| 2019/0110345 | A1* | 4/2019 | Ichikawa | F21S 41/16 |
| 2019/0123541 | A1* | 4/2019 | Takuma | H02H 3/093 |
| 2019/0161006 | A1* | 5/2019 | Ichikawa | F21S 41/14 |
| 2019/0274209 | A1* | 9/2019 | Ichikawa | F21S 41/16 |

FOREIGN PATENT DOCUMENTS

| | | | | |
|---|---|---|---|---|
| EP | 2243661 | A2 | 10/2010 | |
| JP | 04-222 | A | 1/1992 | |
| JP | 2001-275344 | A | 10/2001 | |
| JP | 2004-241142 | A | 8/2004 | |
| WO | 2010070720 | A1 | 6/2010 | |
| WO | 2016021283 | A1 | 2/2016 | |
| WO | WO-2016021283 | A1 * | 2/2016 | ............ H02M 3/155 |
| WO | WO-2017217318 | A1 * | 12/2017 | ............... B60Q 1/04 |

OTHER PUBLICATIONS

International Preliminary Report on Patentability on corresponding PCT Application No. PCT/JP2017/021338, dated Dec. 18, 2018.
First Office Action dated Dec. 24, 2019 in corresponding Chinese Patent Application No. 201780034369.6 with English Translation, 16 pages.
Supplemental European Search Report dated Jan. 14, 2020 in corresponding European Patent Application No. 17813215.5, 12 pages.
Extended European Search Report dated May 15, 2020, issued by the European Patent Office in corresponding European Application No. 17813215.5. (13 pages).

* cited by examiner

LOAD DRIVING APPARATUS

BACKGROUND OF THE INVENTION

1. Field of the Invention

The present invention relates to a load driving apparatus.

2. Description of the Related Art

With conventional techniques, as automotive lamps, and particularly, as headlamp light sources, halogen lamps or HID (High-Intensity Discharge) lamps have been the mainstream. In recent years, as substitutes for such conventional lamps, the development of automotive lamps employing a semiconductor light source such as an LED (light-emitting diode), LD (Laser Diode), or the like has been advancing.

FIG. 1 is a block diagram showing an automotive lamp 300r. The automotive lamp 300r includes a light source 302, a lighting circuit 400r, and a lamp-side ECU (Electric Control Unit) 320r. The light source 302 includes LEDs or LDs. The automotive lamp 300r receives the supply of a voltage $V_{BAT}$ from a battery 600. Furthermore, the automotive lamp 300r is coupled to an vehicle-side ECU 602 via a bus 604. The automotive lamp 300r receives a signal that instructs it to turn on or turn off the light source 302 (on signal or off signal), vehicle speed information, and information on the surroundings acquired by means of a camera or a radar.

The lamp-side ECU 320r includes a switch 322 arranged on a power supply line that extends from the battery 600 to the lighting circuit 400r. Furthermore, a CPU (Central Processing Unit) 324 receives a control signal and various kinds of information from the vehicle-side ECU 602, and integrally controls the automotive lamp 300r. The CPU 324 controls the switch 322. Furthermore, the lamp-side ECU 320r judges whether or not a lighting-on condition is satisfied. When judgment has been made that the lighting-on condition has been satisfied, the lamp-side ECU 320r sets a signal Sig3 for the lighting circuit 400r to a state (e.g., high level) that indicates the lighting-on state. Conversely, when the lighting-on condition has not been satisfied, the lamp-side ECU 320r sets the signal Sig3 to another state (e.g., low level) that indicates the lighting-off state.

The lighting circuit 400r includes a switching converter 410 and a control circuit 430. The switching converter 410 is configured as a step-down converter (Buck converter), for example. The switching converter 410 steps down the battery voltage $V_{BAT}$, and supplies the voltage thus stepped down to the light source 302. The control circuit 430 receives a feedback signal $S_{FB}$ that indicates an electrical state of the light source 302, e.g., a current (lamp current) $I_{LAMP}$ that flows through the light source 302. The control circuit 430 controls the switching converter 410 such that the feedback signal $S_{FB}$ approaches a target value. When the signal Sig3 is set to the low level, the control circuit 430 fixedly sets a switching transistor M1 of the switching converter 410 to the off state, so as to cut off the lamp current $I_{LAMP}$.

1. First Problem

As a result of investigating the automotive lamp 300r shown in FIG. 1, the present inventor has come to recognize the following problem. That is to say, when the CPU 324 has judged that the lighting-on condition does not hold true, the signal Sig3 is set to the low level, which is an instruction to turn off the light. However, with the automotive lamp 300r shown in FIG. 1, such an arrangement has a problem in that the light source 302 cannot be turned off in the following situations.

(1) A case in which a problem occurs in the signal line, which disables transmission of the lighting-off signal.

Specifically, a case is conceivable in which an abnormality occurs in a signal line, terminal, or harness for transmitting the signal Sig3, such that the signal Sig3 is fixedly set to an electric potential that corresponds to the high level. Examples of such a situation include a malfunction in which the signal line is short-circuited to the power supply (e.g., short-circuited to the power supply line or the like).

(2) A case in which an abnormality occurs in a hardware configuration of the control circuit 430.

Specifically, a case is conceivable in which the control circuit 430 is not able to turn off the switching transistor M1 of the switching converter 410 according to a lighting-off indication by the signal Sig3.

(3) A case in which an abnormality occurs in the switching transistor M1 of the switching converter 410.

Specifically, a case is conceivable in which a malfunction occurs in the switching transistor M1 such that the switching transistor M1 is fixedly set to the short-circuited mode.

For example, in a case in which the light source 302 is configured as a high-beam light source, when the lighting-on state remains although the high-beam light is instructed to turn off, this disturbs oncoming vehicles, leading vehicles, and pedestrians.

In recent years, a combination of a laser diode and a fluorescent member has been attracting attention as a high-intensity light source 302. Blue excitation light generated by the laser diode is emitted to the fluorescent member. Yellow fluorescent light emitted from the fluorescent member is mixed with the blue excitation light scattered by the fluorescent member so as to provide white light. However, if an abnormality (which will be referred to as the "light source abnormality" hereafter) has occurred, e.g., if aging degradation occurs in the fluorescent member, if there is a crack in the fluorescent member, or if the fluorescent member has fallen away, the excitation light is directly output without being scattered by the fluorescent member, and is emitted to the area forward of the vehicle. In order to prevent such a problem, a mechanism for detecting the occurrence of such an abnormality in the light source is preferably provided. Furthermore, a protection function is preferably implemented for turning off the light source 302 when an abnormality has been detected. Moreover, in order to provide further improved safety, the light source 302 is preferably turned on only when the light source operates normally and the vehicle speed is equal to or higher than a predetermined value. However, even in a case of providing such a double safety mechanism, if the light source 302 cannot be turned off due to any one of the above-described problems (1) through (3), the blue laser light is emitted to the area forward of the vehicle.

Description will be made regarding such a problem with the automotive lamp 300r as an example. However, the same problem can occur in other lighting devices that differ from such an automotive lamp. This problem is not restricted to such lighting devices. Rather, such a problem can occur in a load driving apparatus that supplies electric power to various kinds of loads.

2. Second Problem

In order to provide improved visibility, as a substitute for an LED, an automotive lamp has been disclosed, including a laser diode (which is also referred to as a "semiconductor laser") and a fluorescent member (see Japanese Patent Application Laid Open No. 2004-241142, Patent document 1, for example). With the technique described in Patent document 1, ultraviolet light, which is an excitation light output from the laser diode, is emitted to the fluorescent member. Upon receiving the ultraviolet light, the fluorescent member generates white light. The white light generated by the fluorescent member is emitted to the area forward of the lighting device. This forms a predetermined light distribution pattern. With the technique described in Patent document 1, the excitation light is not emitted to the area forward of the vehicle.

FIG. 6 is a cross-sectional diagram showing a light source for an automotive lamp investigated by the present inventor. A light source 10 mainly includes a laser diode 12, a fluorescent member 14, an optical system 16, and a housing 18. The light source 10 has a common configuration with the technique described in Patent document 1 from the viewpoint of it including the laser diode 12 and the fluorescent member 14.

The laser diode 12 shown in FIG. 6 generates blue excitation light 20 instead of the ultraviolet light. The excitation light 20 is focused on the fluorescent member 14 by means of the optical system 16. The optical system 16 is configured as a lens, reflecting mirror, optical fiber, or a combination thereof. Upon reception of the blue excitation light 20, the fluorescent member 14 generates fluorescent light 22 having a spectrum distribution over a wavelength region including wavelengths (green to red) that are longer than the excitation light 20. The excitation light 20 emitted to the fluorescent member 14 is scattered by the fluorescent member 14. As a result, after the excitation light 20 passes through the fluorescent member 14, the excitation light 20 has only negligible coherence. The fluorescent member 14 is fitted and held by an opening formed in the housing 18, for example.

FIG. 7 is a diagram showing a spectrum of the output light 24 of the light source 10. The output light 24 of the light source 10 includes the blue excitation light 20a that has passed through the fluorescent member 14 and the green to red fluorescent light 22 emitted from the fluorescent member 14. The output light 24 has a spectrum distribution of white light.

That is to say, with the light source described in Patent document 1, the excitation light, which is ultraviolet light, is not used as a part of the output light to be used to illuminate the area forward of the vehicle. In contrast, with the light source 10 shown in FIG. 6, the blue excitation light is used as a part of the output light of a headlamp.

As a result of investigating the light source 10 shown in FIG. 6, the present inventor has come to recognize the following problem. That is to say, with the light source 10 shown in FIG. 6, if an abnormality has occurred, e.g., if there is a crack in the fluorescent member 14 or if the fluorescent member 14 has fallen away from the housing 18, the excitation light 20 generated by the laser diode 12 is directly output with strong coherence without being scattered by the fluorescent member 14, which is undesirable.

In order to provide improved safety, the following countermeasures are known.

(Countermeasure 1)

The output light of the light source 10 is monitored. When an abnormality (which will be referred to as the "light leakage abnormality") has occurred in which the excitation light 20 leaks without passing through the fluorescent member 14, the output is lowered.

(Countermeasure 2)

When the vehicle speed is lower than a predetermined value, light emission by a high-intensity light source is disabled. By employing the countermeasure 2, this arrangement provides improved safety even if the execution of the countermeasure 1 is delayed or otherwise has no effect.

During maintenance of the vehicle or the lighting device, the vehicle is stationary, and accordingly, the vehicle speed is zero. In order to allow the lighting device employing the countermeasure 2 to turn on even if the vehicle is stationary (or before the lighting device is mounted on the vehicle), the present inventors have proposed a maintenance mode (which will be referred to as the "test mode") in addition to the driving mode (which will be referred to as the "normal mode"). In this case, the limitation of the vehicle speed is disabled so as to allow the lighting device to be turned on even if the vehicle is stationary.

In a workplace or a production line, it can be assumed that there are workers around the vehicle. In this state, in a case in which the high-intensity light source emits light, if a light leakage abnormality occurs, this disturbs the workers in the vicinity of the lighting device. In order to solve this problem, an arrangement is conceivable in which the light emission intensity in the test mode is designed such that it is smaller than the light emission intensity in the normal mode. However, in a case in which the test mode is used to adjust the optical axis (aiming) with a low light emission intensity, this leads to a difficulty in the work when it is bright in the daytime. In addition, in a case in which the test mode is used with such a low light emission intensity, this arrangement cannot support a test of whether or not a high-intensity light source emits light normally with a rated light amount.

Furthermore, in a case in which a laser diode is employed as a high-intensity light source, the following problem occurs. Let us consider a case in which the laser diode is turned on with a driving current that is smaller than an oscillation threshold value. Very large variation can occur in the oscillation threshold value of the laser diode. Accordingly, in a case in which the current amount of the driving current to be used in the test mode is determined giving consideration to such variation in the threshold value, if variation occurs in the threshold value toward the large-value side, this leads to a problem in that the light amount used in the test mode becomes very small.

SUMMARY OF THE INVENTION

An embodiment of the present invention has been made in order to solve the first problem. Accordingly, it is an exemplary purpose thereof to provide a load driving apparatus that is capable of suspending the operation of a load in a sure manner when an abnormality has occurred.

Another embodiment of the present invention has been made in order to solve the second problem. Accordingly, it is an exemplary purpose thereof to provide an in-vehicle lighting apparatus that allows maintenance while securing safety.

1. An embodiment of the present invention relates to a load driving apparatus structured to receive an input voltage from a power supply, and to supply an electric power to a load under a control operation of a processor. The processor outputs a first signal and a second signal in conjunction via a first pin and a second pin such that the first signal and the second signal are negated when the load is instructed to suspend an operation thereof. The load driving apparatus comprises: an output circuit structured to supply an electric power to the load; a protection switch provided on a driving path that extends from the power supply to the load and returns to the power supply; and a control circuit structured such that, when the first signal is asserted, the output circuit is set to an operation state, and such that, when the first signal is negated, the output circuit is set to a suspension state, and also such that, when the second signal is asserted, the protection switch is turned on, and moreover such that, when the second signal is negated, the protection switch is turned off.

When the first signal and the second signal are both negated in order to suspend the operation of the load, when at least one from among the first and second signals is negated, this arrangement is capable of suspending the operation of the load even if the other signal cannot be negated, or otherwise even if a malfunction occurs in a hardware component.

Also, the output circuit may comprise a transistor structured to adjust an electrical state of the load. Also, when the first signal is asserted, the control circuit may control the transistor such that the electrical state of the load approaches a target value. Also, when the first signal is negated, the control circuit may turn off the transistor.

Also, the output circuit may be configured as a switching converter. Also, the transistor may be configured as a switching transistor. By suspending the operation of the switching transistor, this arrangement is capable of suspending the supply of electric power to the load.

Also, the load may comprise a light-emitting element structured to emit an excitation light and a fluorescent member structured to be excited by the excitation light and to emit a fluorescence light, and may be configured to output a white output light comprising the excitation light and a spectrum of the fluorescence light. Also, when a light leakage abnormality is detected in the light source, the processor may negate the first signal and the second signal.

Also, at least one from among the first signal and the second signal may be generated as a pulse signal in an asserted state, and may be generated as a DC signal in a negated state. With this arrangement, when the signal line for transmitting an asserted-state signal is short-circuited to a fixed electric potential, judgment is made that this signal is in the negated state, thereby allowing the operation of the load to be suspended.

Another embodiment of the present invention relates to an automotive lamp. The automotive lamp may comprise: a light source; the load driving apparatus structured to drive the light source; and a processor structured to control the load driving apparatus.

2. Yet another embodiment of the present invention relates to a lighting circuit employed in an automotive lamp. The lighting circuit comprises: a driving circuit structured to supply a driving current to a light-emitting element of a light source; and an abnormality detector structured to detect an abnormality that can occur in the light source. The lighting circuit is structured to be switchable between a first mode in which the driving current is raised with a first slope (or gradient) when lighting is started up and a second mode in which the driving current is raised with a second slope that is smaller than the first slope when lighting is started up.

The abnormality detector involves a detection delay. In addition, this arrangement involves an operation delay before the protection is effectively provided. By selecting the second mode, when an abnormality has occurred, this arrangement allows the rate of increase of the driving current to be reduced during the detection delay time and the operation delay time. Accordingly, this arrangement is capable of providing protection in a state in which the driving current is small.

Also, a target value of the driving current in the second mode may be substantially the same as the target value of the driving current in the first mode. When an abnormality has not been detected in the second mode, this arrangement allows the light source to emit light with the same luminance as that in the first mode. This allows a function test for a lighting device to be performed.

Yet another embodiment of the present invention also relates to a lighting circuit employed in an automotive lamp. The lighting circuit comprises: a driving circuit structured to supply a driving current to a light-emitting element of a light source; and an abnormality detector structured to detect an abnormality that can occur in the light source. The lighting circuit is structured to be switchable between a first mode in which the driving current is raised up to a predetermined value in a first start-up time when lighting is started up and a second mode in which the driving current is raised up to the predetermined value in a second start-up time that is longer than the first start-up time when lighting is started up.

By selecting the second mode, when an abnormality has occurred, this arrangement allows the rate of increase of the driving current to be reduced during the detection delay time and the operation delay time. Accordingly, this arrangement is capable of providing protection in a state in which the driving current is small.

Also, the light source may comprise: a laser diode structured as a light-emitting element; and a fluorescent member structured to be excited by an excitation light emitted from the laser diode, and to emit a fluorescence light, so as to generate a white output light including the excitation light and a fluorescence spectrum. Also, the abnormality detector may detect an abnormality which is leakage of the excitation light.

Also, when the automotive lamp is to be tested, the second mode may be selected. Also, when the speed of a vehicle is lower than a predetermined threshold value, the second mode may be selected.

Yet another embodiment of the present invention relates to an automotive lamp. The automotive lamp comprises: a light source comprising a light-emitting element; and any one of the above-described lighting circuits structured to supply a driving current to the light-emitting element.

Yet another embodiment of the present invention also relates to an automotive lamp. The automotive lamp comprises: a light source comprising a light-emitting element; and a lighting circuit structured to supply a driving current to the light-emitting element. The lighting circuit comprises: a driving circuit structured to supply a driving current to the light-emitting element of the light source; and an abnormality detector structured to detect an abnormality that can occur in the light source. The driving circuit is structured to be switchable between a first mode in which the light amount of the light source is raised with a first slope when lighting is started up and a second mode in which the light amount of the light source is raised with a second slope that is smaller than the first slope when lighting is started up.

By selecting the second mode, when an abnormality has occurred, this arrangement allows the rate of increase of the light amount to be reduced during the delay time and the operation delay time. Accordingly, this arrangement is capable of providing protection in a state in which the light amount is small.

Yet another embodiment of the present invention also relates to an automotive lamp. The automotive lamp comprises: a light source comprising a light-emitting element; and a lighting circuit structured to supply a driving current to the light-emitting element. The lighting circuit comprises: a driving circuit structured to supply a driving current to a light-emitting element of a light source; and an abnormality detector structured to detect an abnormality that can occur in the light source. The driving circuit is structured to be switchable between a first mode in which the light amount of the light source is raised up to a predetermined value in a first start-up time and a second mode in which the light amount is raised up to the predetermined value in a second start-up time that is longer than the first start-up time.

By selecting the second mode, when an abnormality has occurred, this arrangement allows the rate of increase of the light amount to be reduced during the delay time and the operation delay time. Accordingly, this arrangement is capable of providing protection in a state in which the light amount is small.

It should be noted that any combination of the components described above, any component of the present invention, or any manifestation thereof, may be mutually substituted between a method, apparatus, system, and so forth, which are also effective as an embodiment of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

Figure 1:
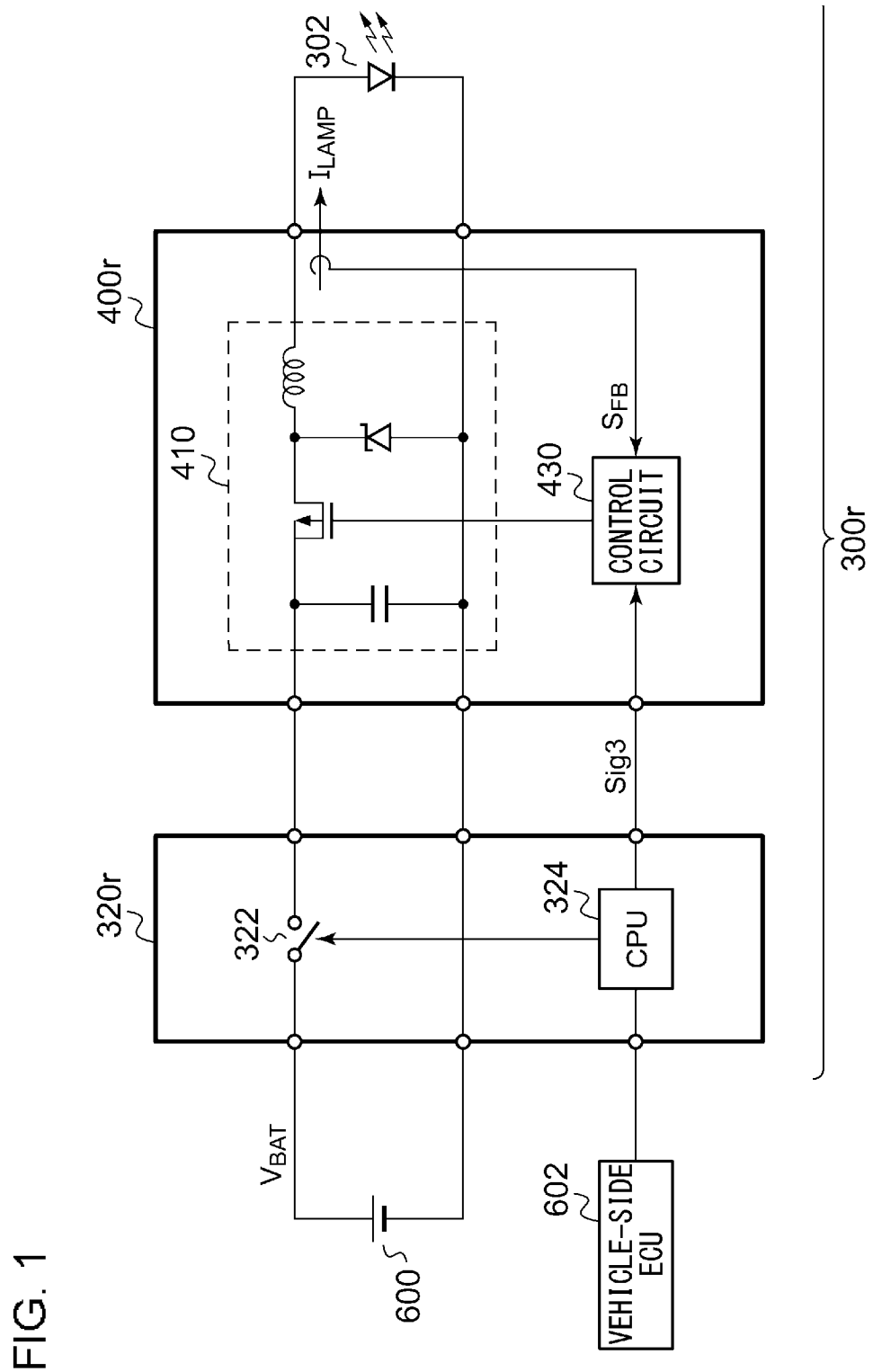
FIG. 1 is a block diagram showing an automotive lamp.

Description will be made below regarding the present invention based on preferred embodiments with reference to the drawings. The same or similar components, members, and processes are denoted by the same reference numerals, and redundant description thereof will be omitted as appropriate. The embodiments have been described for exemplary purposes only, and are by no means intended to restrict the present invention. Also, it is not necessarily essential for the present invention that all the features or a combination thereof be provided as described in the embodiments.

In the present specification, the state represented by the phrase "the member A is coupled to the member B" includes a state in which the member A is indirectly coupled to the member B via another member that does not substantially affect the electric connection between them, or that does not damage the functions or effects of the connection between them, in addition to a state in which they are physically and directly coupled.

Similarly, the state represented by the phrase "the member C is provided between the member A and the member B" includes a state in which the member A is indirectly coupled to the member C, or the member B is indirectly coupled to the member C via another member that does not substantially affect the electric connection between them, or that does not damage the functions or effects of the connection between them, in addition to a state in which they are directly coupled.

In the present specification, the reference symbols denoting electric signals such as a voltage signal, current signal, or the like, and the reference symbols denoting circuit elements such as a resistor, capacitor, or the like, also represent the corresponding voltage value, current value, resistance value, or capacitance value as necessary.

First Embodiment

Figure 2:
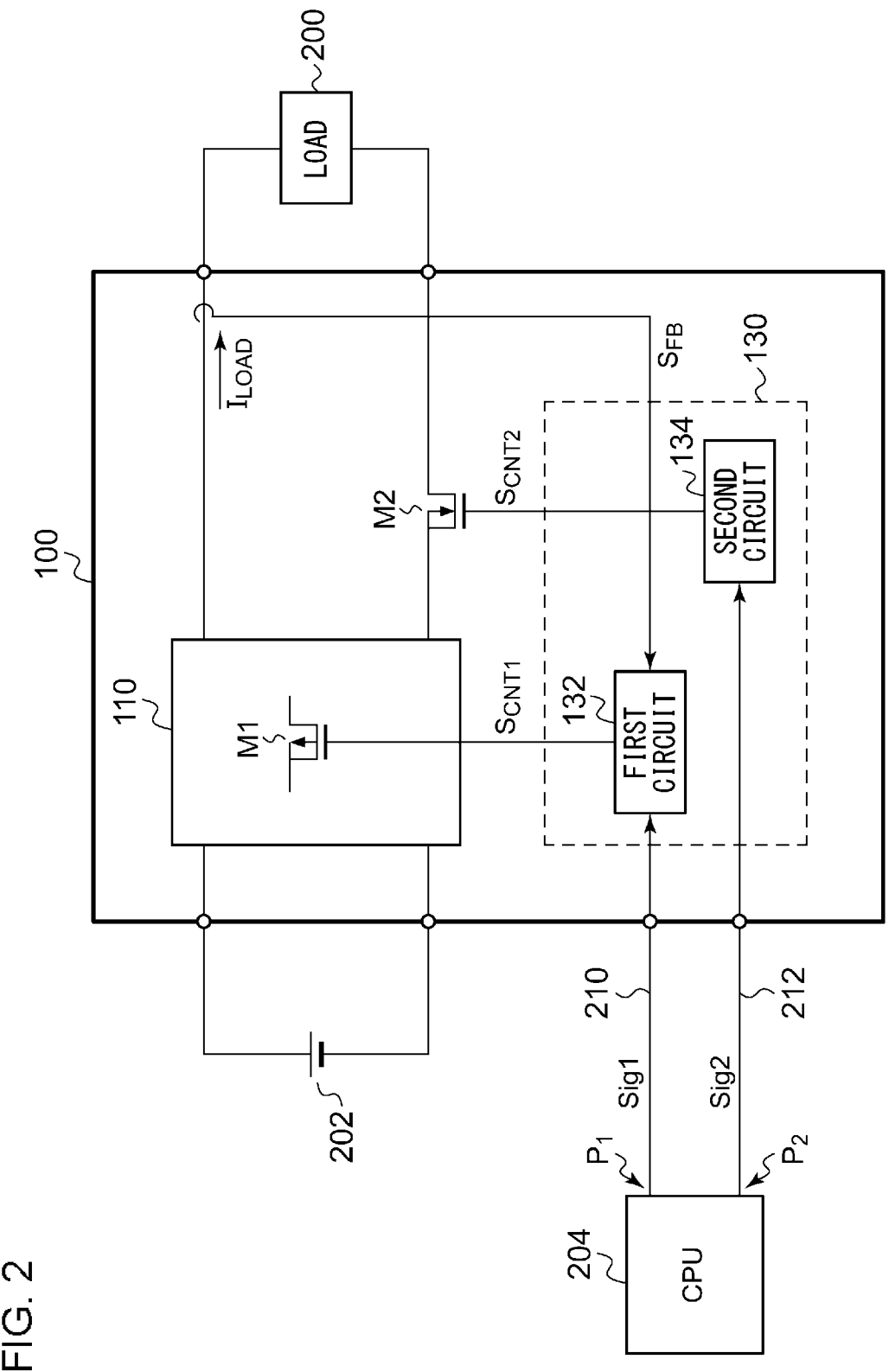
FIG. 2 is a block diagram showing a load driving apparatus according to a first embodiment.

FIG. 2 is a block diagram showing a load driving apparatus 100 according to a first embodiment. The load driving apparatus 100 receives an input voltage $V_{BAT}$ from a power supply 202 configured as a battery or the like, and supplies electric power to a load 200. Examples of the load 200 include: (i) light sources including a semiconductor light-emitting element such as an LED, LD, organic EL (Electro Luminance), or the like; (ii) light sources that generate X ray or ultraviolet light; (iii) electron beam sources; (iv) rotary motors, linear motors, voice coil motors, and actuators; (v) speakers and headphones; and the like. However, the load 200 is not restricted to such arrangements. Also, the load 200 may be configured as an electricity storage element such as a battery, a capacitor, or the like. Also, the load driving circuit 100 may be configured as a charger circuit.

The load driving apparatus 100 operates under the control of a CPU 204. The CPU 204 instructs at least the load 200 to switch between an operation state and a suspension state. The CPU 204 outputs a first signal Sig1 and a second signal Sig2 in conjunction via a first pin $P_1$ and a second pin $P_2$ such that they are negated when the operation of the load 200 is to be suspended and such that they are asserted when the operation of the load 200 is to be started.

The load driving apparatus 100 includes an output circuit 110, a protection switch M2, and a control circuit 130. The output circuit 110 supplies electric power to the load 200.

The protection switch M2 is provided on a driving path that extends from the power supply 202 to the load 200 and returns to the power supply 202. As the protection switch M2, a MOSFET (Metal Oxide Semiconductor Field Effect Transistor), bipolar transistor, IGBT, or the like, may be employed.

When the first signal Sig1 is asserted, the control circuit 130 sets the output circuit 110 to the operation state. When the first signal Sig1 is negated, the control circuit 130 sets the output circuit 110 to the suspension state. Furthermore, when the second signal Sig2 is asserted, the control circuit 130 turns on the protection switch M2. When the second signal Sig2 is negated, the control circuit 130 turns off the protection switch M2.

The control circuit 130 and the CPU 204 are coupled via a first line 210 for transmitting the first signal Sig1 and a second line 212 for transmitting the second signal Sig2. The first line 210 and the second line 212 may each be configured as a wiring line on a printed circuit board, a cable, or a combination thereof.

For example, the output circuit 110 includes the transistor M1 for adjusting the electrical state of the load 200. Examples of the electrical state of the load 200 include a voltage, current, or electric power supplied to the load 200. The output circuit 110 is configured as a switching converter (switch mode power supply), a linear power supply, a switching amplifier, a linear amplifier, an inverter, a chopper circuit, or the like. In a case in which the output circuit 110 is configured as a switching circuit such as a switching converter, a switching amplifier, a chopper circuit, or the like, the transistor M1 corresponds to a switching transistor. In a case in which the output circuit 110 is configured as a linear power supply or a linear amplifier, the transistor M1 corresponds to an output transistor having an on resistance that is adjusted according to the gate-source voltage (base-emitter voltage or otherwise base current) thereof.

When the first signal Sig1 is asserted, the control circuit 130 controls the transistor M1 of the output circuit 110 such that the electrical state of the load 200 approaches a target value. When the first signal Sig1 is negated, the transistor M1 is turned off. When the transistor M1 is turned off, the output circuit 110 comes to be in a suspension state.

The control circuit 130 includes a first circuit 132 that generates a control signal $S_{CNT1}$ for the transistor M1, and a second circuit 134 that generates a control signal $S_{CNT2}$ for the protection switch M2. The first circuit 132 and the second circuit 134 are each configured as a separate hardware configuration. In a case in which the transistor M1 is configured as a P-channel (PNP) transistor, the low level of the control signal $S_{CNT1}$ corresponds to the on state, and the high level thereof corresponds to the off state. In a case in which the transistor M1 is configured as an N-channel (NPN) transistor, the low level of the control signal $S_{CNT1}$ corresponds to the off state, and the high level thereof corresponds to the on state. The control circuit 130 may be configured as a combination of a discrete circuit and an IC (Integrated Circuit), an IC, or a discrete circuit.

Description will be made regarding the signal design of the first signal Sig1 and the second signal Sig2. At least one from among the first signal Sig1 and the second signal Sig2 may be designed such that it is generated as a pulse signal in the asserted state, and such that it is generated as a DC signal in the negated state. In the present embodiment, the first signal Sig1 is designed in such a manner described above. An input stage of the first circuit 132 may judge whether or not the first signal Sig1 is a pulse signal, or otherwise may judge whether or not the duty ratio of the first signal Sig1 is within a predetermined range.

In the present embodiment, the second signal Sig2 employs a so-called low-active design. That is to say, the second signal Sig2 is designed such that the asserted state is assigned to the low level thereof, and such that negated level is assigned to the high level thereof (high-impedance state). Accordingly, the input stage of the second circuit 134 may be configured as a buffer circuit that judges whether the second signal Sig2 is set to the high level or the low level.

Figure 3A:
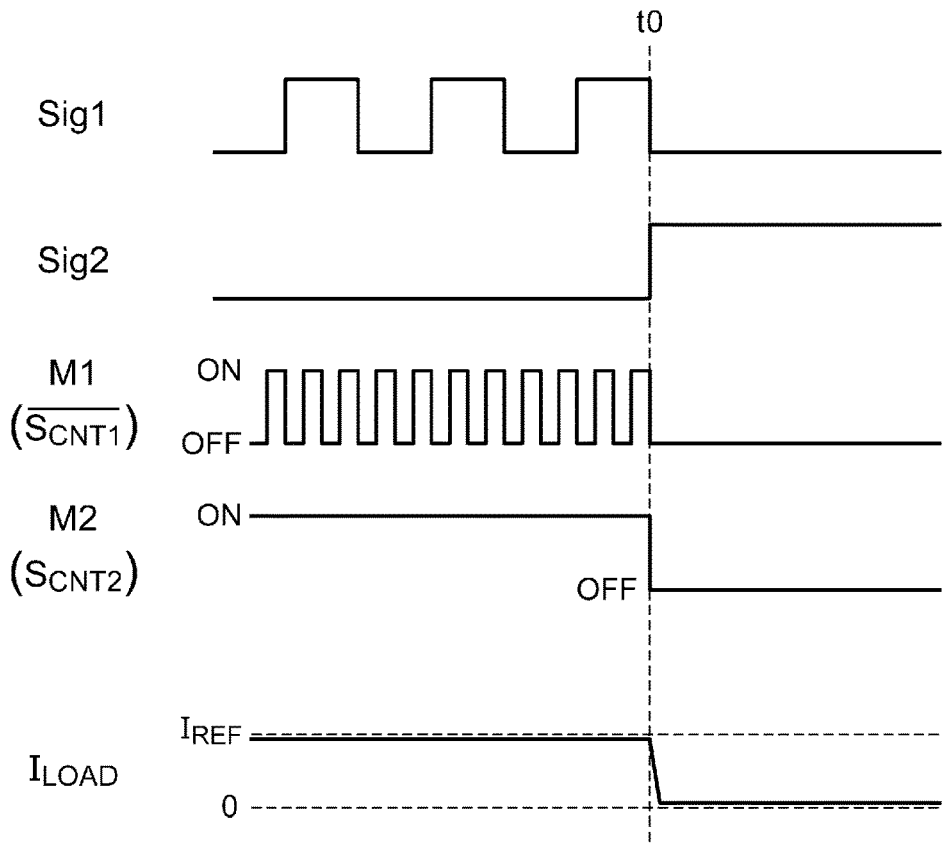
FIGS. 3A and 3B are operation waveform diagrams each showing the operation of the load driving apparatus shown in FIG. 2.
Figure 3B:
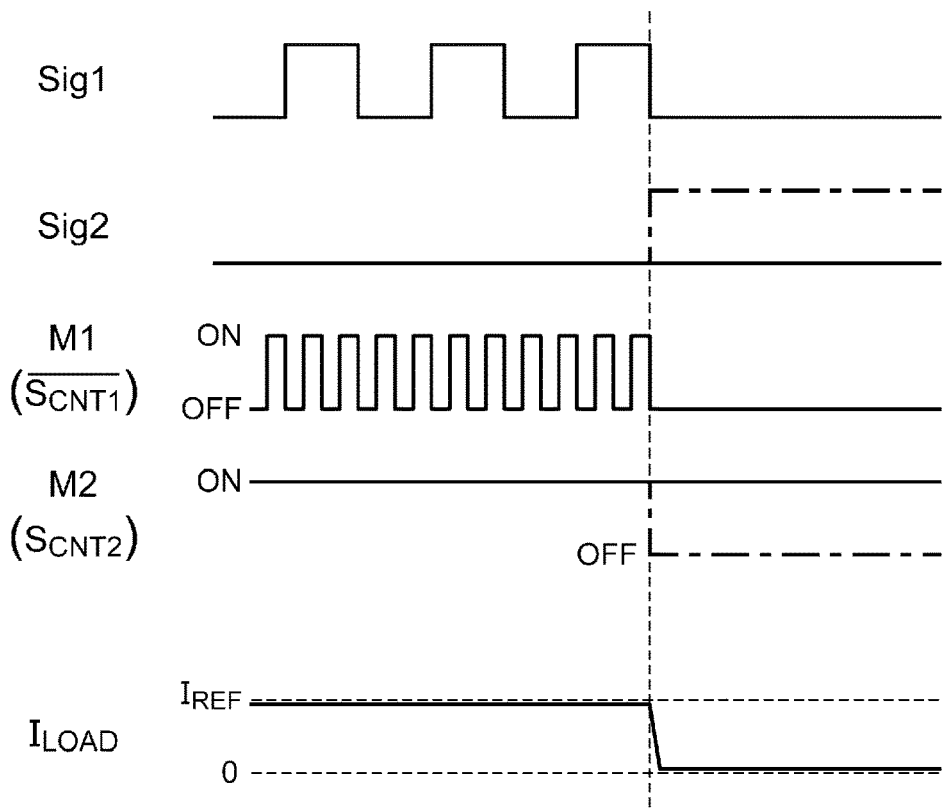

The above is the configuration of the load driving apparatus 100. Next, description will be made regarding the operation thereof. FIGS. 3A and 3B are operation waveform diagrams each showing the operation of the load driving apparatus 100 shown in FIG. 2. FIG. 3A shows a lighting-off operation in the normal state. Before the time point t0, the first signal Sig1 and the second signal Sig2 are each set to the asserted state. In this stage, the first circuit 132 controls the transistor M1 such that the electrical state of the load 200 approaches the target value. In a case in which the load current $I_{LOAD}$ is employed as the electrical state of the load 200 and the transistor M1 is configured as a switching transistor, the duty ratio of the gate signal $S_{CNT1}$ of the transistor M1 is adjusted such that the load current $I_{LOAD}$ is stabilized to a target value $I_{REF}$ thereof. Furthermore, the protection switch M2 is set to the on state.

When a condition in which the load 200 is to be suspended arises at time t0, the CPU 204 switches both the first signal Sig1 and the second signal Sig2 to the negated state. In response to this, the first circuit 132 fixedly sets the control signal $S_{CNT1}$ for the transistor M1 to the off level (high level), so as to set the output circuit 110 to the suspension state. As a result, the load current $I_{LOAD}$ becomes zero. In addition, the second circuit 134 fixedly sets the control signal $S_{CNT2}$ to the off level (low level), and accordingly, the protection switch M2 is fixedly set to the off state. As a result, the path of the load current $I_{LOAD}$ is cut off, and accordingly, the load current $I_{LOAD}$ becomes zero.

FIG. 3B shows a lighting-off operation in an abnormal state. Description will be made below regarding an abnormality in which the second line 212 for transmitting the second signal Sig2 is short-circuited to the ground line.

The operation before the time point t0 is the same as that shown in FIG. 3A. In this case, an abnormality has occurred in which the second line 212 is short-circuited to the ground. However, the second signal Sig2 generated by the CPU 204 is set to the low level. Accordingly, the abnormality in which the second line 212 is short-circuited to the ground has no effect.

At the time point t0, the CPU 204 negates the first signal Sig1 and the second signal Sig2. The first signal Sig1 is set to a DC signal, i.e., set to the negated state. The second signal Sig2 is to be switched to the high level that corresponds to the negated state as indicated by the line of alternately long and short dashes. However, the second signal Sig2 remains at the low level that corresponds to the asserted state as indicated by the solid line, due to an abnormality in which the second line 212 has been short-circuited to the ground. That is to say, the second signal Sig2 cannot be negated.

In this case, the second circuit 134 maintains the on state of the protection switch M2. However, the assertion of the first signal Sig1 is effective, and accordingly, the first circuit 132 is able to set the output circuit 110 to the suspension state. When the output circuit 110 is set to the suspension state, this arrangement is able to suspend the load 200 by cutting off the electric power supplied to the load 200 even if the protection switch M2 remains in the on state.

On the other hand, when the second line 212 operates normally, but when the first signal Sig1 cannot be negated due to an abnormality that occurs in the first line 210 or the CPU 204, the output circuit 110 continues its operation. However, the protection switch M2 is turned off. Accordingly, this arrangement is able to suspend the load 200.

The above is the operation of the load driving apparatus 100. With the load driving apparatus 100, the CPU 204 generates two separate signals in the form of a dual system, each of which provides instruction for operation and suspension of the load driving apparatus 100. The two signals are transmitted via two independent signal lines 210 and 212. This arrangement is capable of preventing the load 200 from continuing its operation when the load 200 is to be suspended.

Figure 4:
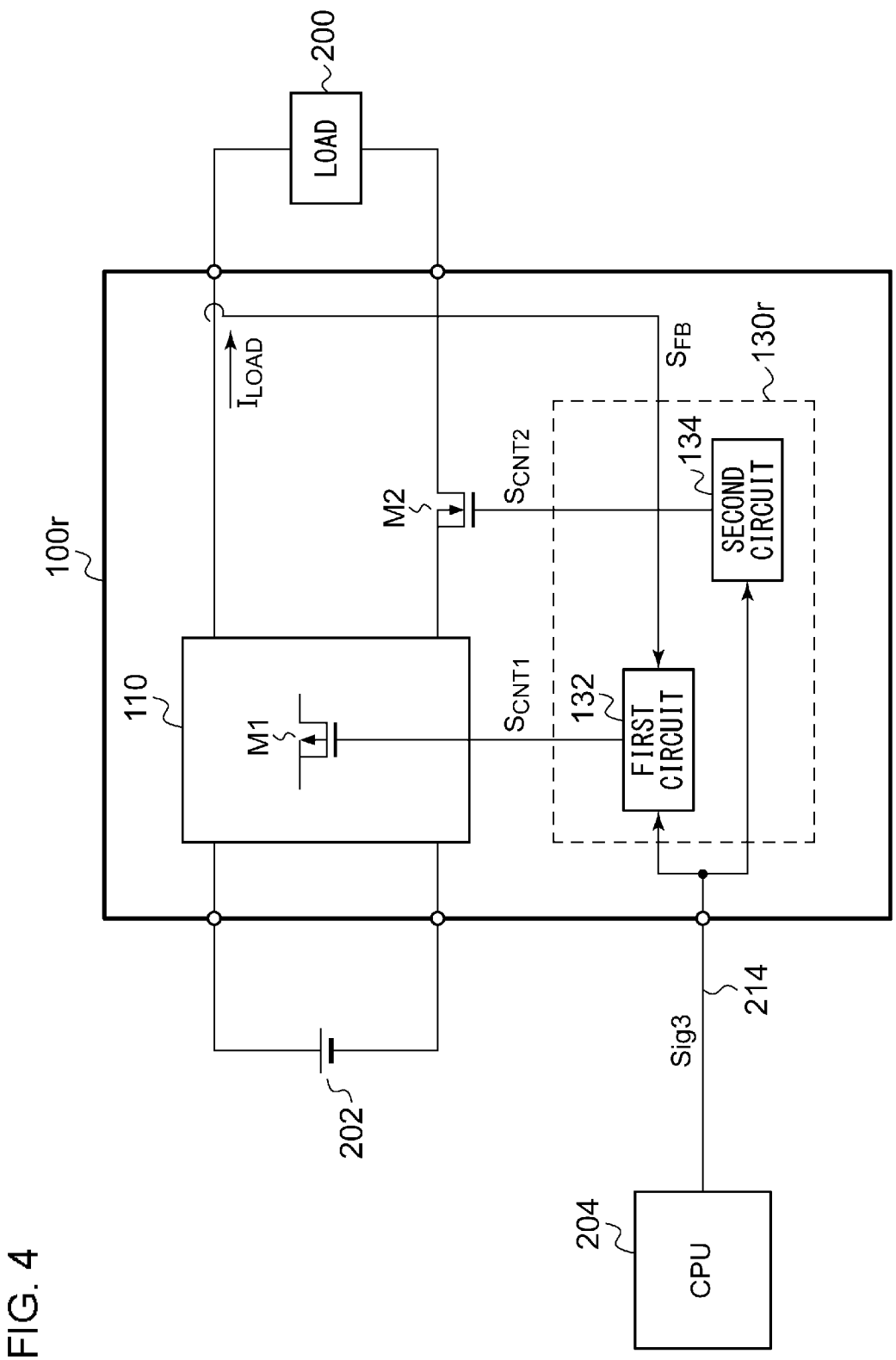
FIG. 4 is a block diagram showing a load driving apparatus according to a comparison technique.

The advantage of the load driving apparatus 100 shown in FIG. 2 can be more clearly understood in comparison with the load driving apparatus 100r shown in FIG. 4. FIG. 4 is a block diagram showing a load driving apparatus 100r according to a comparison technique. It should be noted that the load driving apparatus 100r shown in FIG. 4 is by no means to be regarded as a known technique. A CPU 204r outputs a third signal Sig3 via a single pin so as to instruct the load driving apparatus 100r to switch between the operation state and the suspension state. The third signal Sig3 is input to the load driving apparatus 100r via a signal line 214. The third signal Sig3 is divided into two signals within the load driving apparatus 100r, which are input to the first circuit 132 and the second circuit 134, respectively.

With the load driving apparatus 100r, if an abnormality occurs in the signal line 214 or in the CPU 204 such that the third signal Sig3 cannot be negated, the first circuit 132 is not able to suspend the operation of the output circuit 110, and the second circuit 134 is not able to turn off the protection switch M2. As a result, this leads to a problem in that the power supply to the load 200 remains.

With the load driving apparatus 100 shown in FIG. 2, this arrangement is capable of solving such a problem that can occur in the load driving apparatus 100r shown in FIG. 4.

The present invention encompasses various kinds of apparatuses and circuits that can be regarded as a block configuration or a circuit configuration shown in FIG. 2, or otherwise that can be derived from the aforementioned description. That is to say, the present invention is not restricted to a specific configuration. More specific description will be made below regarding an example configuration for clarification and ease of understanding of the essence of the present invention and the circuit operation. That is to say, the following description will by no means be intended to restrict the technical scope of the present invention.

Figure 5:
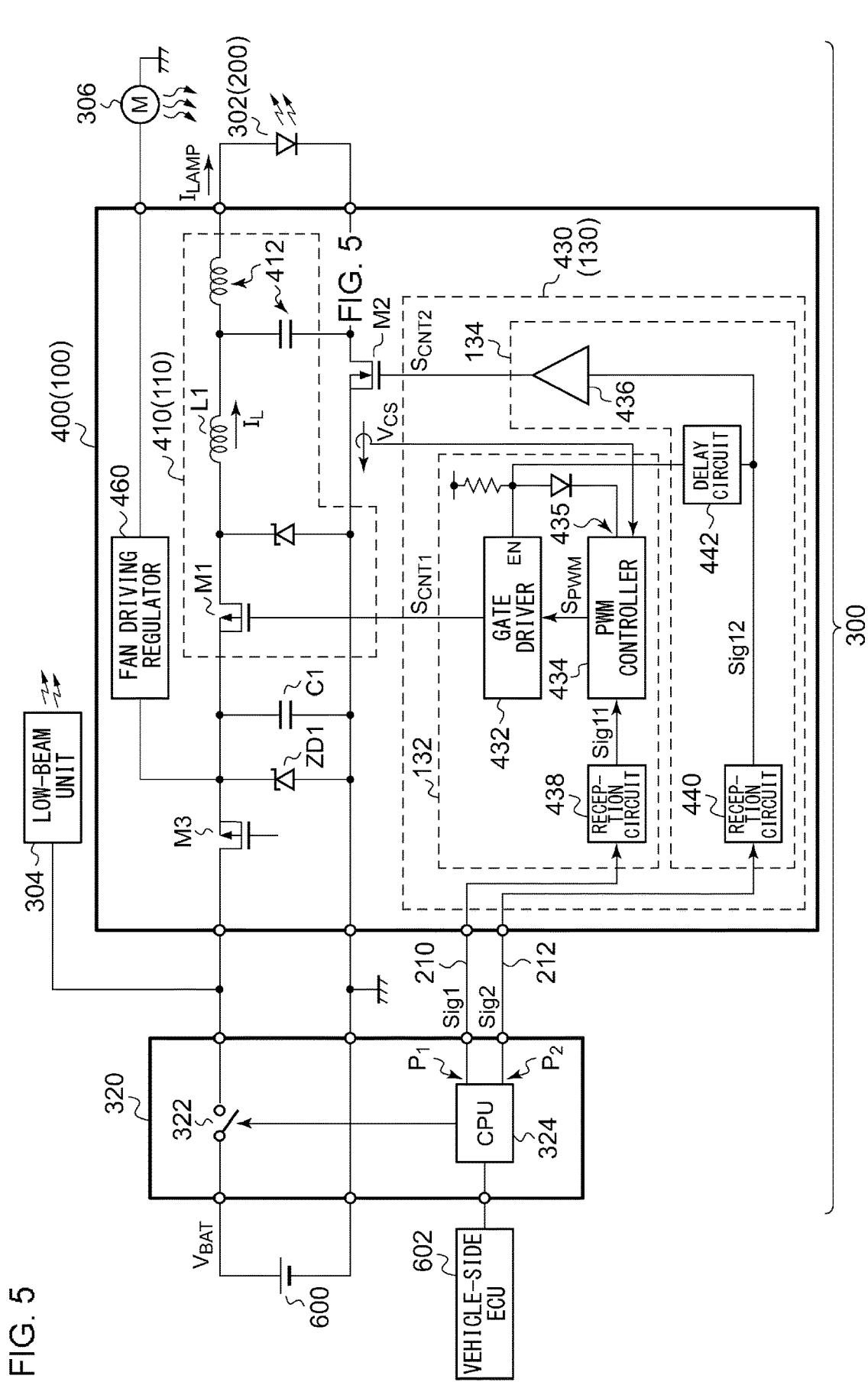
FIG. 5 is a block diagram showing an automotive lamp according to a first embodiment.

FIG. 5 is a block diagram showing an automotive lamp 300 according to the first embodiment. The automotive lamp 300 can be understood as the same configuration as that of the automotive lamp 300r shown in FIG. 1 further employing the architecture of the load driving apparatus 100 shown in FIG. 2.

That is to say, the lighting circuit 400 and the light source 302 shown in FIG. 5 correspond to the load driving apparatus 100 and the load 200 shown in FIG. 2, respectively. Furthermore, the switching converter 410 and the control circuit 430 shown in FIG. 5 correspond to the output circuit 110 and the control circuit 130 shown in FIG. 2, respectively. The CPU 324 shown in FIG. 5 corresponds to the CPU 204 shown in FIG. 2.

Figure 6:
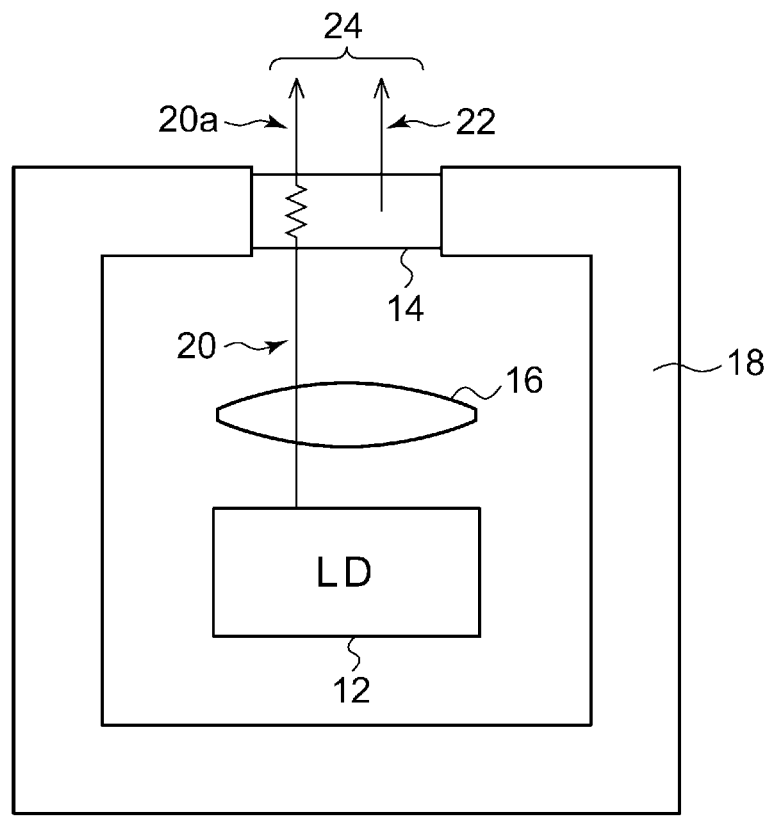
FIG. 6 is a cross-sectional diagram showing a laser lamp which is an example of a light source shown in FIG. 5.

FIG. 6 is a cross-sectional diagram showing a laser lamp 10 which is an example of the light sourced 302 shown in FIG. 5. The laser lamp 10 mainly includes a laser diode 12, a fluorescent member 14, an optical system 16, and a housing 18. The laser diode 12 generates blue excitation light 20. The excitation light 20 is focused on the fluorescent member 14 by means of the optical system 16. The optical system 16 is configured as a lens, reflecting mirror, optical fiber, or a combination thereof. Upon reception of the blue excitation light 20, the fluorescent member 14 generates fluorescence light 22 having a spectrum distribution over a wavelength region including wavelengths (green to red) that are longer than the excitation light 20. The excitation light 20 emitted to the fluorescent member 14 is scattered by the fluorescent member 14. As a result, after the excitation light 20 passes through the fluorescent member 14, the excitation light 20 has only negligible coherence. The fluorescent member 14 is fitted to and held by an opening formed in the housing 18, for example.

Figure 7:
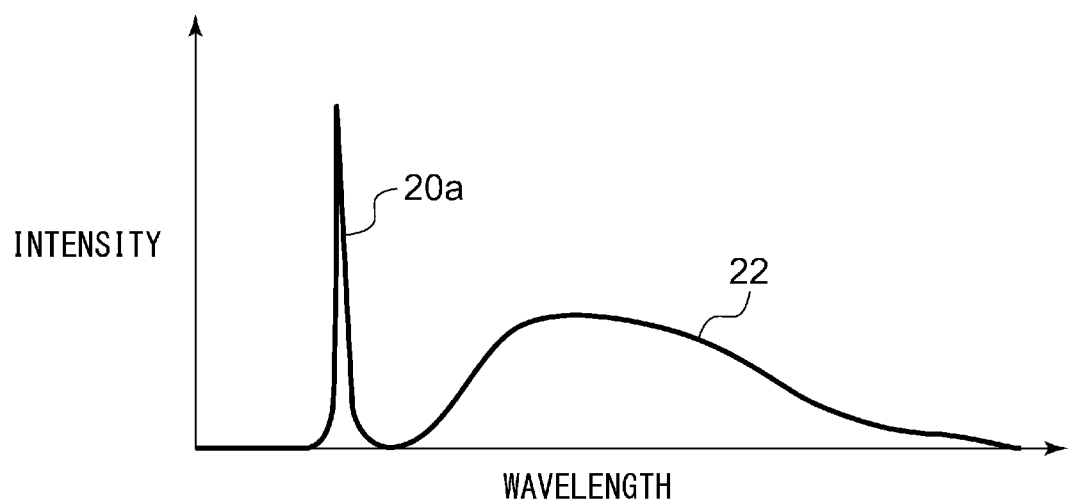
FIG. 7 is a diagram showing a spectrum of an output light of the laser lamp.

FIG. 7 is a diagram showing a spectrum of the output light 24 of the laser lamp 10. The output light 24 of the laser lamp 10 includes the blue excitation light 20a that has passed through the fluorescent member 14 and the green to red fluorescence light 22 emitted from the fluorescent member 14. The output light 24 has a spectrum distribution of while light.

Returning to FIG. 5, the switching converter 410 is configured as a constant current converter, and supplies a lamp current $I_{LAMP}$ to the light source 302. The switching converter 410 includes a transistor M1, a diode D1, and an inductor L1. As an upstream stage of the switching converter 410, an input smoothing capacitor C1 and a Zener diode ZD1 may be provided. Also, a transistor M3 may be inserted between the switching converter 410 and the lamp-side ECU 320 in order to protect the circuit from reverse connection of the battery 600.

As an output stage of the switching converter 410, a filter 412 may be provided so as to smooth the lamp current $I_{LAMP}$. The control circuit 430 receives, as an input signal, a current detection signal $V_{CS}$ that indicates the detection value of the lamp current $I_{LAMP}$ (or otherwise a coil current $I_L$ that flows through the inductor L1). The control circuit 430 feedback controls at least one from among the duty ratio, frequency, on time, and off time, of the transistor M1, such that the lamp current $I_{LAMP}$ approaches a target current $I_{REF}$.

The control circuit 430 includes a first driver 432, a PWM controller 434, a second driver 436, a first reception circuit 438, a second reception circuit 440, and a delay circuit 442. The first driver 432, the PWM controller 434, and the first reception circuit 438 correspond to the first circuit 132 shown in FIG. 2. Furthermore, the second driver 436, the second reception circuit 440, and the delay circuit 442 correspond to the second circuit 134 shown in FIG. 2.

The first reception circuit 438 receives the first signal Sig1, and generates a first judgment signal Sig11 configured as a binary signal that can be set to the high level and the low level, which indicate the asserted state and the negated state. The PWM controller 434 generates a pulse signal $S_{PWM}$ such that the current detection signal $V_{CS}$ approaches its target value. The configuration and the modulation method employed in the PWM controller 434 are not restricted in particular. Rather, known techniques may be employed. For example, the PWM controller 434 may be configured as a controller employing a comparator using a Bang-Bang control method (hysteresis window method, upper-detection fixed-off-time method, bottom-detection fixed-on-time method), or may be configured as a controller employing an error amplifier.

The first driver 432 drives the transistor M1 according to the pulse signal $S_{PWM}$. The first driver 432 may include an enable terminal EN. When the enable terminal EN is pulled up to the high level, the first driver 432 is set to the enabled state. Conversely, when the enable terminal EN is pulled down, the first driver 432 is set to the disabled state. In the disabled state, the driver 432 fixedly sets the control signal $S_{CNT1}$ to the high level, which fixedly sets the transistor M1 to the off state.

When the first judgment signal Sig11 indicates the asserted state, the PWM controller 434 generates the pulse signal $S_{PWM}$ that corresponds to the current detection signal $V_{CS}$. Furthermore, when the first judgment signal Sig11 indicates the negated state, the PWM controller 434 fixedly sets the pulse signal $S_{PWM}$ to a level that corresponds to the off level of the transistor M1.

The PWM controller 434 has an open-drain or otherwise open-collector output 435. When the first judgment signal Sig11 indicates an asserted state, the PWM controller 434 sets the output 435 to the open state. Conversely, when the first judgment signal Sigh indicates the negated state, the PWM controller 434 sets the output 435 to the low level. This arrangement is capable of controlling the EN terminal of the first driver 432 according to the first judgment signal Sig11.

The second reception circuit 440 receives the second signal Sig2, and generates a second judgment signal Sig12 configured as a binary signal that can be set to the high level and the low level, which indicate the asserted state and the negated state. When the second judgment signal Sig12 indicates the asserted state, the second driver 436 turns on the protection switch M2. Conversely, when the second judgment signal Sig12 indicates the negated state, the second driver 436 turns off the protection switch M2.

Also, when the second judgment signal Sig12 indicates the asserted state, the control circuit 430 may set the EN terminal to the high-impedance state. Conversely, when the second judgment signal Sig12 indicates the negated state, the control circuit 430 may pull down the EN terminal.

Preferably, the control circuit 430 includes a delay circuit 442. The delay circuit 442 delays an edge of the second judgment signal Sig12 that changes from the negated state to the asserted state. The control circuit 430 changes the state of the EN terminal based on the delayed signal. As a result, after a delay time elapses after the protection switch M2 is turned on, the first driver 432 is enabled. That is to say, this arrangement is capable of setting the switching converter 410 to the operation state after the current path of the lamp current $I_{LAMP}$ is secured after the protection switch M2 is turned on.

The lighting circuit 400 further mounts a fan driving regulator 460. The fan driving regulator 460 receives an input voltage in common with the switching converter 410, and drives a cooling fan 306.

The lighting circuit 400 and the light source 302 are configured as a high-beam unit. In addition, the automotive lamp 300 includes a low-beam unit 304. Also, the low-beam unit 304 operates receiving the power supply voltage $V_{BAT}$ from the lamp-side ECU 320.

When the occurrence of the light leakage abnormality has been detected in the light source 302, the CPU 324 negates the first signal Sig1 and the second signal Sig2. Furthermore, when the vehicle speed becomes lower than a predetermined value, the CPU 324 negates the first signal Sig1 and the second signal Sig2.

The above is the configuration of the automotive lamp 300. With the automotive lamp 300, the light source 302 can be turned off even if any one from among the first signal Sig1 and the second signal Sig2 cannot be negated.

The lighting-off of the light source 302 is supported by suspending the operation of the switching converter 410 and by turning off the protection switch M2. Accordingly, the switch 322 is not required to be operated according to the on/off state of the high-beam unit (light source 302). Instead, the switch 322 may preferably be controlled according to the on/off state of the low-beam unit. Accordingly, the lamp-side ECU 320 can be shared by the low-beam unit 304 and the high-beam unit. In other words, the power supply for the lighting circuit 400 for the high-beam unit can be operated in synchronization with the power supply for the low-beam unit 304.

Furthermore, the power supply voltage is supplied to the fan driving regulator 460 during the on state of the low-beam unit 304 regardless of whether or not the light source 302 is turned on or off. Accordingly, this arrangement is capable of maintaining the rotational driving operation of the cooling fan 306 during the on state of the low-beam unit 304. If the switching between the rotation state and the suspension state of the cooling fan 306 is excessively repeated, this becomes a cause of a reduced lifetime of the cooling fan 306. In order to solve such a problem, instead of rotationally driving the cooling fan 306 according to the on/off state of the light source 302, the cooling fan 306 is rotationally driven according to the on/off state of the low-beam unit 304. This allows the lifetime of the cooling fan 306 to be increased.

Description has been made above regarding an embodiment of the present invention with reference to the first embodiment. The above-described embodiment has been described for exemplary purposes only, and is by no means intended to be interpreted restrictively. Rather, it can be readily conceived by those skilled in this art that various modifications may be made by making various combinations of the aforementioned components or processes, which are also encompassed in the technical scope of the present invention. Description will be made below regarding such modifications.

Regarding Usage and Load

Description has been made in the first embodiment regarding the lighting device with the light source as a load. However, the kind of the load and the circuit configuration of the load driving apparatus 100 are not restricted in particular. For example, the load 200 may be configured as a motor which is a power source for sliding doors or power windows installed in the vehicle. The sliding doors and the power windows each have a safety function in which the operation thereof is immediately suspended when a human body or other object is caught in it. By employing the architecture of the load driving apparatus 100 shown in FIG. 2 in the control mechanism of a motor for sliding doors or power windows, this provides improved safety.

The architecture of the load driving apparatus 100 is not restricted to such a usage as an in-vehicle device. Rather, the architecture of the load driving apparatus 100 is widely applicable to various kinds of devices such as industrial devices, consumer devices, compact devices, consumer electronics devices, and the like.

Second Embodiment

Figure 8:
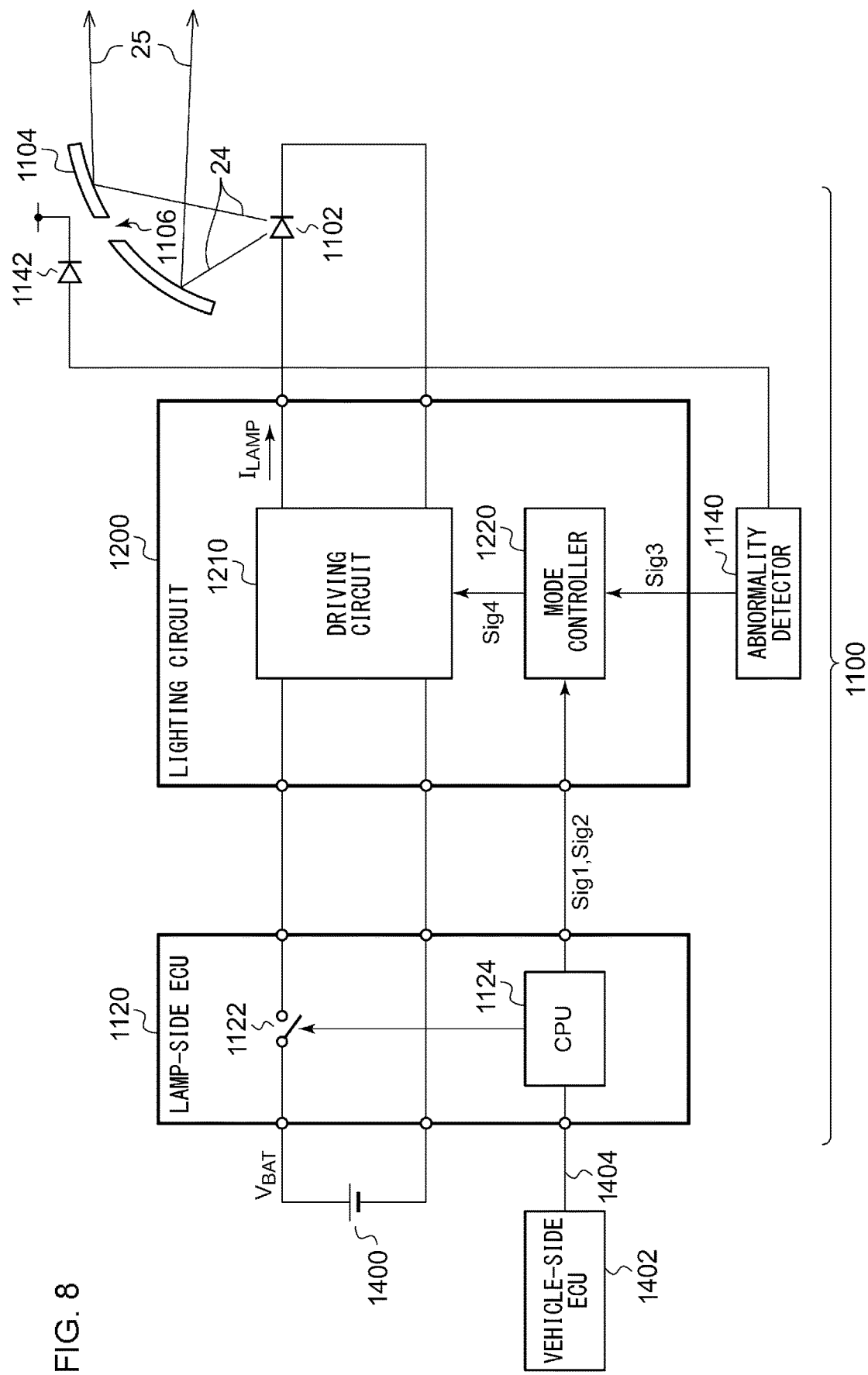
FIG. 8 is a block diagram showing an automotive lamp according to a second embodiment.

FIG. 8 is a block diagram showing an automotive lamp 1100 according to a second embodiment. The automotive lamp 1100 includes a light source 1102, a lighting circuit 1200, a lamp-side ECU (Electronic Control Unit) 1120, and an abnormality detector 1140. The light source 1102 includes a semiconductor light source such as an LED, LD, organic EL, or the like. The light source 1102 is configured as a high-intensity light source having the potential to disturb humans in the vicinity of the light source when an abnormality has occurred, for example. However, the light source 1102 is not restricted to such an arrangement. As an example, the light source 1102 may be the light source 10 shown in FIG. 6.

The automotive lamp 1100 receives the supply of a voltage $V_{BAT}$ from a battery 1400. Furthermore, the automotive lamp 1100 is coupled with the vehicle-side ECU 1402 via a bus 1404. The automotive lamp 1100 receives, from the vehicle-side ECU 1402, a signal that indicates the lighting-on/lighting-off (on/off) operation of the lighting device, vehicle speed information, information on the surroundings acquired by means of a camera or a radar, data that indicates a mode described later, etc.

The lamp-side ECU 1120 includes a switch 1122 and a CPU (Central Processing Unit) 1124. The switch 1122 is provided on a power supply line that extends from the battery 1400 to the lighting circuit 1200. The CPU 1124 receives a control signal and various kinds of information from the vehicle-side ECU 1402, and integrally controls the automotive lamp 1100.

The CPU 1124 controls the switch 1122. Furthermore, the CPU 1124 judges whether or not the lighting-on condition has been satisfied. When judgment is made that the lighting-on condition has been satisfied, the CPU 1124 sets a lighting control signal Sig1 for the lighting circuit 1200 to a state (e.g., high level) which indicates the lighting-on state. When judgment is made that the lighting-on condition has not been satisfied, the lighting circuit 1200 sets the lighting control signal Sig1 to a state (e.g., low level) that indicates the lighting-off state.

Upon reception of a lighting-on instruction from the CPU 1124, the lighting circuit 1200 supplies a driving current (lamp current) $I_{LAMP}$ to the light source 1102.

The abnormality detector 1140 monitors the presence or absence of an abnormality that can occur in the light source 1102. Upon detecting an abnormality, the abnormality detector 1140 asserts an abnormality detection signal Sig3. When the abnormality detection signal Sig3 is asserted, the automotive lamp 1100 cuts off the output light 25 from the automotive lamp 1100. Alternatively, in this case, the automotive lamp 1100 lowers the energy density per unit solid angle. For example, in response to an assertion of the abnormality detection signal Sig3, the lighting circuit 1200 immediately reduces the driving current $I_{LAMP}$ to zero or otherwise to a value that is equal to or smaller than a threshold current, so as to turn off the light source 1102. Also, instead of or in addition to reducing the driving current $I_{LAMP}$, in response to an assertion of the abnormality detection signal Sig3, the automotive lamp 1100 may insert an optical element that blocks or otherwise scatters the light emitted from the light source 1102 on an optical path of the output light 24 emitted from the light source 1102.

The abnormality detector 1140 may be configured using the technique described in Japanese Patent Application Laid Open No. 2016-058370. For example, the abnormality detector 1140 may be coupled to at least one photodetector element 1142 that receives a part of the output light 24 of the light source 1102. The abnormality detector 1140 may detect an abnormality that can occur in the light source 1102 based on the output of the photodetector element 1142. For example, the abnormality detector 1140 may use a first photodetector element having sensitivity for an excitation light and a second photodetector element having sensitivity for a fluorescent light to detect the output light 24 of the light source 1102. The abnormality detector 1140 may judge whether or not the ratio between the excitation light and the fluorescent light exhibits a normal ratio.

The automotive lamp 1100 may include a reflector 1104 that reflects the output light of the light source 1102. The reflector 1104 is provided with an opening (or slit) 1106. The photodetector element 1142 is provided on the back face of the reflector 1104. The photodetector element 1142 may be arranged such that it receives light that passes through the opening 1106.

The opening 1106 is preferably formed in a portion of the reflector 1104 such that, when the light leakage abnormality has occurred, the excitation light that has not been scattered is focused on the opening 1106. When an abnormality has occurred in the light source 1102, this arrangement is capable of preventing the excitation light that has not scattered from being reflected to the area forward of the vehicle. That is to say, the opening 1106 provides a function of extracting a part of the output light for detecting an abnormality and a function of removing the non-scattered excitation light when an abnormality has occurred.

In the present embodiment, the lighting circuit 1200 is configured to be switchable between a first mode and a second mode. In the first mode, the lighting circuit 1200 raises the driving current $I_{LAMP}$ with a first slope when the lighting-on operation is started. In the second mode, the lighting circuit 1200 raises the driving current $I_{LAMP}$ with a second slope that is smaller than the first slope when the lighting-on operation is started.

The first slope is designed to be optimum for a normal operation. For example, the first slope is designed such that the driving current $I_{LAMP}$ reaches a rated value in a period of 500 ms to 2 s. In contrast, the second slope is designed on the order of ½₀ to ½ of the first slope.

That is to say, the automotive lamp 1100 according to the second embodiment is capable of switching between the first mode in which the light amount output from the light source 1102 is raised with the first slope and the second mode in which the light amount is raised with the second slope that is smaller than the first slope.

Figure 9:
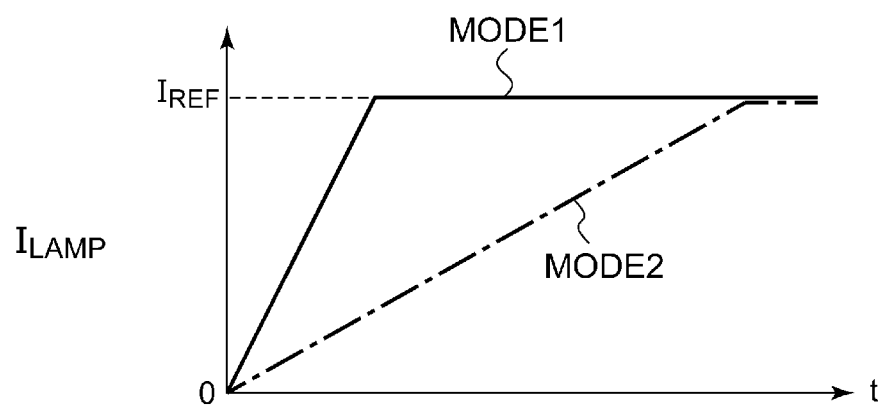
FIG. 9 is a waveform diagram showing an example of the driving current $I_{LAMP}$ in the first mode and the second mode.

FIG. 9 is a waveform diagram showing an example of the driving current $I_{LAMP}$ in the first mode and the second mode. The MODE1 indicated by the solid line represents a waveform in the first mode. The MODE2 indicated by the line of alternately long and short dashes represents a waveform in the second mode. The target value of the driving current $I_{LAMP}$ in the second mode may be substantially the same as the target value (rated current) $I_{REF}$ of the driving current $I_{LAMP}$ in the first mode.

From another viewpoint, the lighting circuit 1200 is capable of switching between the first mode in which the driving current $I_{LAMP}$ is raised to a predetermined value in a first start-up time T1 and the second mode in which the driving current $I_{LAMP}$ is raised to the predetermined value in a second start-up time T2 that is longer than the first start-up time T1. FIG. 9 shows an arrangement in which the predetermined threshold value is set to the target value $I_{REF}$ (rated current). However, the present invention is not restricted to such an arrangement.

Returning to FIG. 8, in addition to the lighting-on instruction signal Sig1, the CPU 1124 generates a mode control signal Sig2 for indicating the first mode or the second mode, and supplies the mode control signal Sig2 to the lighting circuit 1200. The lighting control signal Sig1 and the mode control signal Sig2 may be transmitted via respective separate signal lines. Alternatively, the lighting control signal Sig1 and the mode control signal Sig2 may be transmitted in the form of a superimposed signal via a single signal line. For example, the electrical state of the single signal line may be configured to be switchable between three states. Also, an arrangement may be made in which the first state is assigned to the lighting-off state, the second state is assigned to the lighting-on state in the first mode, and the third state is assigned to the lighting-on state in the second mode. For example, this arrangement may support the first state configured as a state in which a DC signal occurs in the signal line, a second state configured as a state in which a pulse signal occurs in the signal line with a duty ratio that is larger than (or otherwise smaller than) a threshold value, and a third state configured as a state in which a pulse signal occurs in the signal line with a duty ratio that is smaller than (or otherwise larger than) a threshold value. Alternatively, this arrangement may support the first state configured as a state in which a DC signal occurs in the signal line, a second state configured as a state in which a pulse signal occurs in the signal line with a frequency that is larger than (or otherwise smaller than) a threshold value, and a third state configured as a state in which a pulse signal occurs in the signal line with a frequency that is smaller than (or otherwise larger than) a threshold value.

The lighting circuit 1200 includes a driving circuit 1210 and a mode controller 1220. The mode controller 1220 receives the lighting control signal Sig1 and the mode control signal Sig2, judges the on/off instruction and the mode, and operates the driving circuit 1210 in the mode thus judged.

The driving circuit 1210 includes a switching converter such as a step-down (Buck converter) or otherwise a step-up converter. The driving circuit 1210 drives the light source 1102 according to a control signal Sig4 received from the mode controller 1220.

Figure 10A:
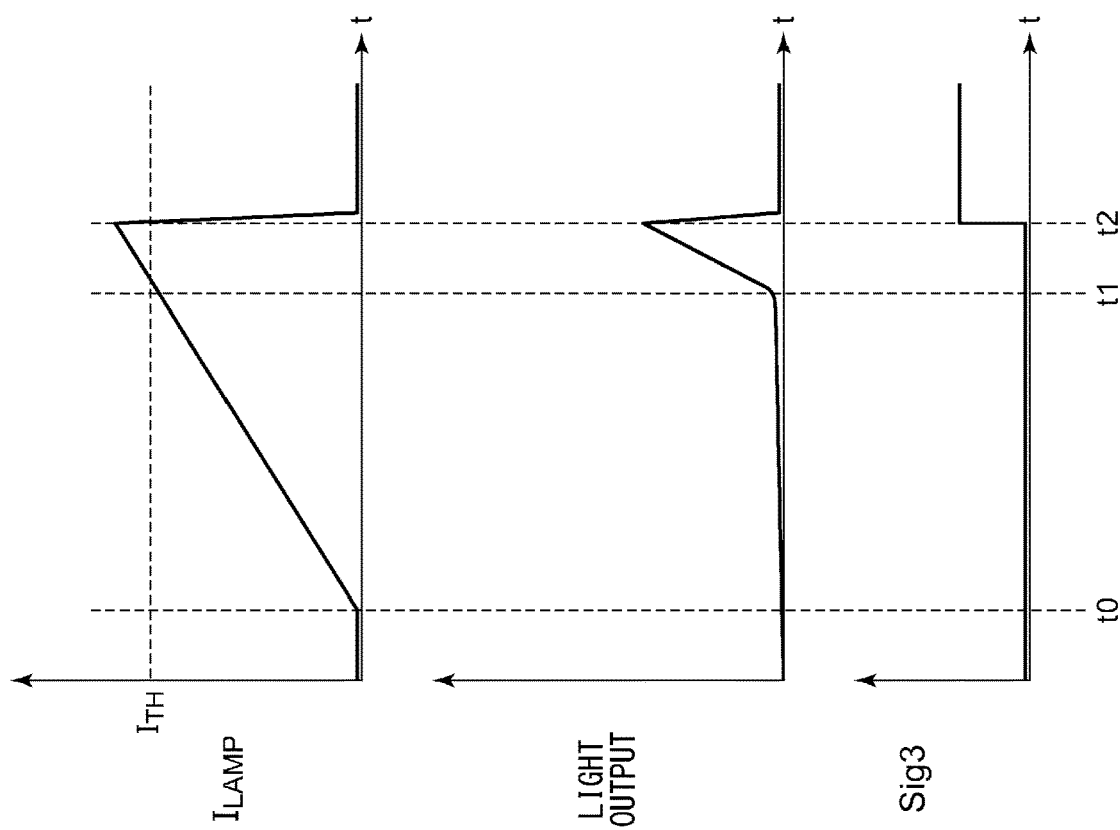
FIG. 10A is a waveform diagram showing a maintenance operation of an automotive lamp in the first mode.
Figure 10B:
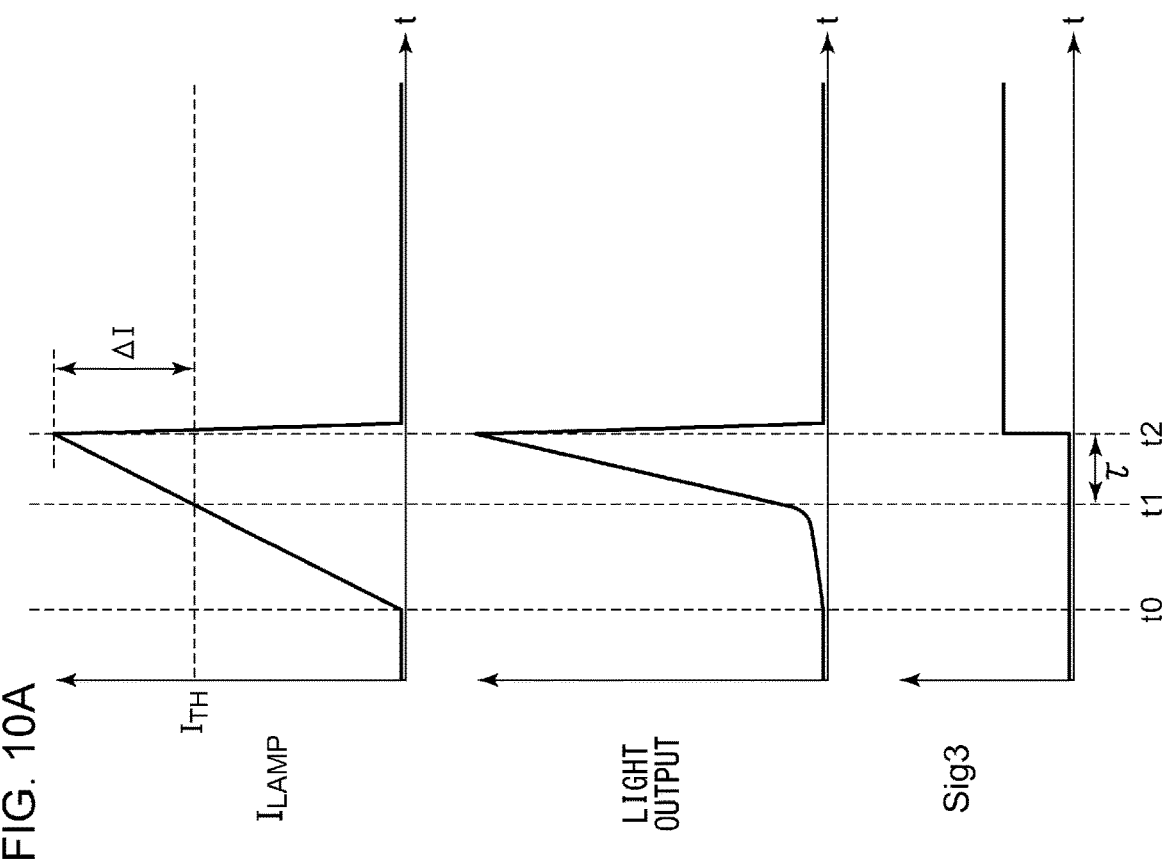
FIG. 10B is a waveform diagram showing a maintenance operation of the automotive lamp in the second mode.

The above is the configuration of the automotive lamp 1100. Next, description will be made regarding the operation thereof. FIG. 10A is a waveform diagram showing the maintenance operation of the automotive lamp 1100 in the first mode. FIG. 10B is a waveform diagram showing the maintenance operation of the automotive lamp 1100 in the second mode. Description will be made assuming that the light leakage abnormality occurs in the light source 1102.

In order to clarify one problem to be solved by the present invention, description will be made with reference to FIG. 10A regarding the operation in the first mode. Upon receiving an instruction to start up the operation in the first mode at the time point t0, the driving current $I_{LAMP}$ rises with a first slope. When the driving current $I_{LAMP}$ becomes larger than a threshold value $I_{TH}$ at the time point t1, this raises the light output from the light source 1102 to a level based on which the abnormality detector 1140 can judge that an abnormality has occurred. When the abnormality detection signal Sig3 is asserted by the abnormality detector 1140 at the time point t2 after a judgment time τ elapses from t1, the driving current $I_{LAMP}$ becomes zero.

In a case in which the driving current $I_{LAMP}$ is raised with a large slope, this increases an increment ΔI of the driving current $I_{LAMP}$ that occurs in the judgment time τ defined by the abnormality detector 1140. As a result, the light output from the light source 1102 becomes very large immediately before the driving current $I_{LAMP}$ is cut off. This results in a very large output of the leaked excitation light.

Next, description will be made with reference to FIG. 10B regarding the start-up operation in the second mode. When a start-up instruction is supplied in the second mode at the time point t0, the driving current $I_{LAMP}$ is raised with the second slope. Subsequently, when the driving current $I_{LAMP}$ becomes larger than the threshold value $I_{TH}$ at the time point t1, this raises the light output from the light source 1102 to a level based on which the abnormality detector 1140 can judge that an abnormality has occurred. When the abnormality detection signal Sig3 is asserted by the abnormality detector 1140 at the time point t2 after a judgment time τ elapses from the time point t1, the driving current $I_{LAMP}$ becomes zero.

In the second mode, the driving current $I_{LAMP}$ is raised with a small slope. This reduces an increment ΔI of the driving current $I_{LAMP}$ that occurs in the judgment time τ defined by the abnormality detector 1140. As a result, this arrangement is capable of reducing the light output of the light source 1102 output immediately before the driving current $I_{LAMP}$ is cut off. Accordingly, this arrangement is capable of reducing the output of the leaked excitation light, thereby providing improved safety.

When the abnormality detector 1140 does not detect an abnormality, the driving current $I_{LAMP}$ is raised up to the rated value $I_{REF}$, and accordingly, the light source 1102 emits light with the same luminance as that in a normal driving mode. This allows a function test to be performed for the automotive lamp 1100, optical axis adjustment, etc.

The present invention encompasses various kinds of apparatuses and circuits that can be regarded as a block configuration or a circuit configuration shown in FIG. 8, or otherwise that can be derived from the aforementioned description. That is to say, the present invention is not restricted to a specific configuration. More specific description will be made below regarding an example configuration for clarification and ease of understanding of the essence of the present invention and the circuit operation. That is to say, the following description will by no means be intended to restrict the technical scope of the present invention.

Figure 11:
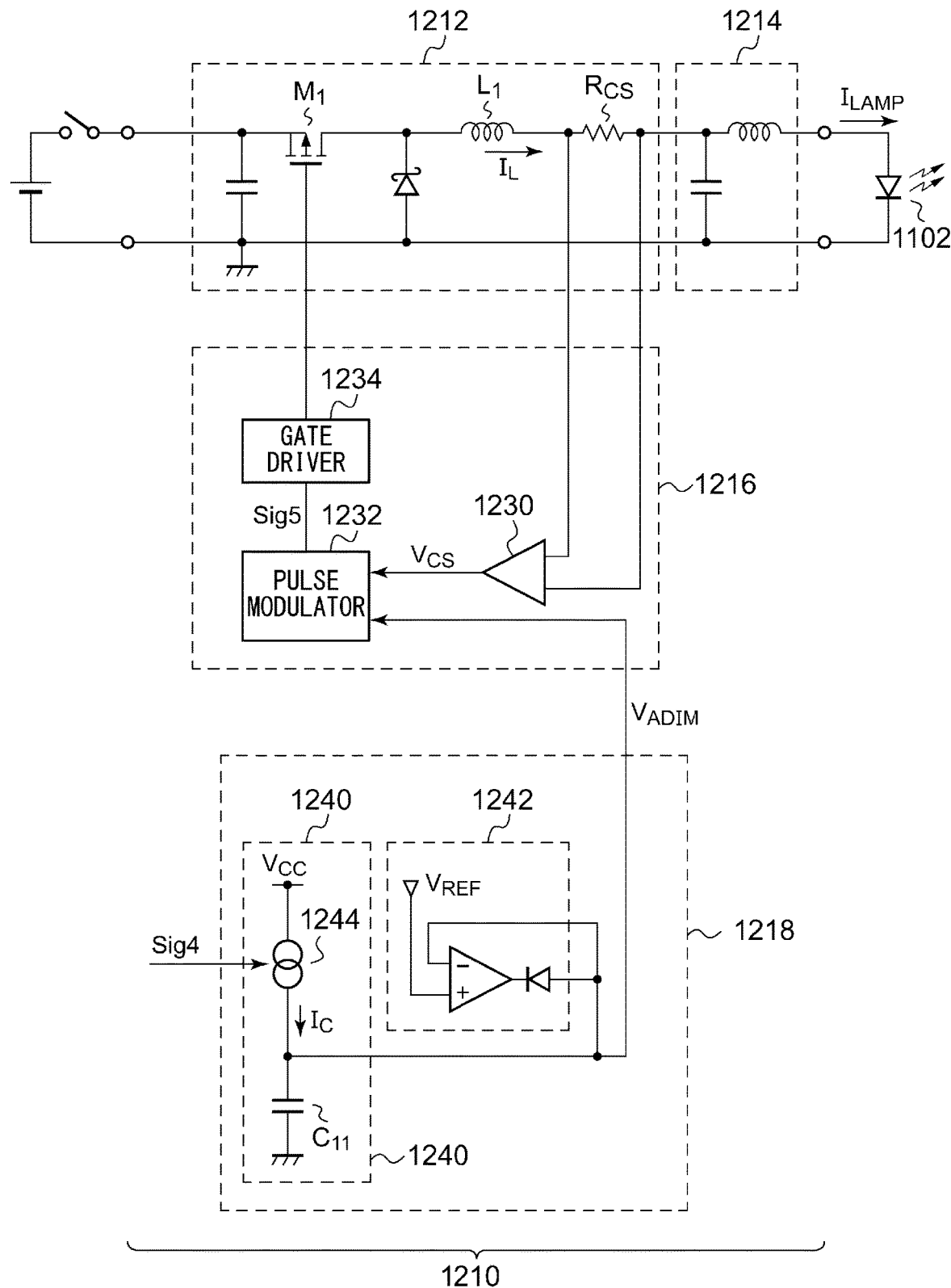
FIG. 11 is a circuit diagram showing an example configuration of a driving circuit.

FIG. 11 is a circuit diagram showing an example configuration of the driving circuit 1210. The driving circuit 1210 mainly includes a switching converter 1212, a smoothing circuit 1214, a converter controller 1216, and a gradual-change lighting circuit 1218.

The switching converter 1212 is configured as a step-down converter, and steps down the input voltage supplied from a battery. The smoothing circuit 1214 removes a ripple component from the output current $I_{CUT}$ of the switching converter 1212, so as to generate a smoothed lamp current $I_{LAMP}$. The smoothing circuit 1214 may be omitted.

The converter controller 1216 controls the switching operation of the switching transistor $M_1$ of the switching converter 1212 such that the detection signal $V_{CS}$ that represents the lamp current $I_{LAMP}$ (or the current $I_L$ that flows through the inductor $L_1$) approaches an analog dimming signal $V_{ADIM}$. For example, the converter controller 1216 includes a current detection circuit 1230, a pulse modulator 1232, and a gate driver 1234. The current detection circuit 1230 detects the lamp current $I_{LAMP}$. For example, the current detection circuit 1230 may be configured as an amplifier that amplifies the voltage drop that occurs across a current sensing resistor $R_{CS}$ arranged on a path of the lamp current $I_{LAMP}$.

The pulse modulator 1232 generates a pulse signal Sig5 such that the current detection signal $V_{CS}$ approaches the analog dimming signal $V_{ADIM}$ that indicates the target value of the current detection signal $V_{CS}$. The configuration and the method employed in the pulse modulator 1232 is not restricted in particular. The pulse modulator 1232 may employ a control method using an error amplifier. Also, the pulse modulator 1232 may employ a Bang-Bang control method. The Bang-Bang control method may employ any one from among a hysteresis window method, a bottom-detection fixed-on-time detection method, and an upper-detection fixed-off-time detection method.

The gradual-change lighting circuit 1218 generates the analog dimming signal $V_{ADIM}$. The gradual-change lighting circuit 1218 receives the control signal Sig4 from the mode controller 1220. The control signal Sig4 includes two instructions, i.e., the mode specifying instruction and the lighting-on start instruction. Upon receiving an instruction to turn on the light in the first mode, the gradual-change lighting circuit 1218 raises the analog dimming signal $V_{ADIM}$ with the first slope from zero toward the target value $V_{REF}$. Upon receiving an instruction to turn on the light in the second mode, the gradual-change lighting circuit 1218 raises the analog dimming signal $V_{ADIM}$ with the second slope from zero toward the target value $V_{REF}$.

The gradual-change lighting circuit 1218 includes a time constant circuit 1240 and a voltage clamp circuit 1242. However, the gradual-change lighting circuit 1218 is not restricted to such an arrangement. The time constant circuit 1240 includes a capacitor $CC_{11}$ and a charger circuit 1244 that charges the capacitor $C_{11}$. The charger circuit 1244 may be configured as a variable current source that generates a constant current $I_C$ that corresponds to the mode indicated by the control signal Sig4. In the first mode, the variable current source generates a first current having a relatively large current value. In the second mode, the variable current source generates a second current having a relatively small current value. The voltage $V_{ADIM}$ occurs across the capacitor $C_{11}$ according to the charge amount supplied from the charger circuit 1244. The voltage clamp circuit 1242 clamps the voltage $V_{ADIM}$ across the capacitor $C_{11}$ such that it does not exceed a predetermined reference value $V_{REF}$. The reference voltage $V_{REF}$ determines the rated value (target value) of the driving current. With the gradual-change lighting circuit 1218, this arrangement is capable of generating the analog dimming signal $V_{ADIM}$ having a correlation with the driving current $I_{LAMP}$ shown in FIG. 9.

The waveform of the driving current $I_{LAMP}$ is not restricted to a straight line. Rather, the driving current $I_{LAMP}$ may have a desired waveform. Specifically, with the waveform of the driving current $I_{LAMP}$ of the first mode as f(t), and with the waveform of the driving current $I_{LAMP}$ of the second mode as g(t), this arrangement requires only the following condition in a predetermined current range $I_L < I_{LAMP} < I_H$.

$$f'(t) > g'(t) \quad (1)$$

Figure 12A:
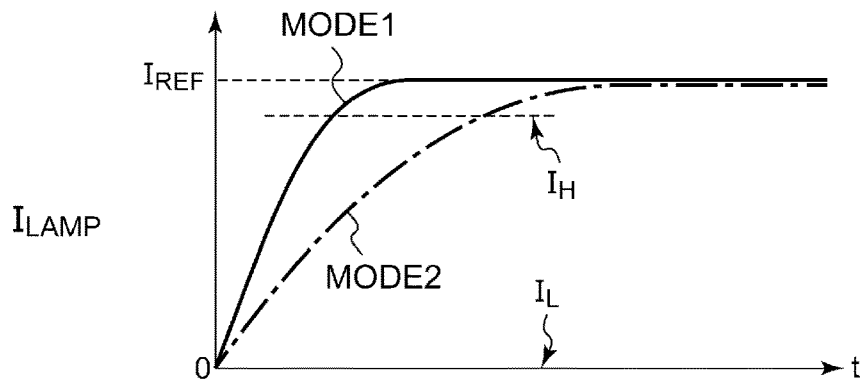
FIGS. 12A through 12D are waveform diagrams each showing a modification of the driving current $I_{LAMP}$ in the start-up operation.

FIGS. 12A through 12D are waveform diagrams each showing the driving current $I_{LAMP}$ in the start-up operation according to a modification. FIG. 12A shows an example in which the driving current $I_{LAMP}$ is represented by a function having a curve that protrudes upward in both the first mode and the second mode. By configuring the charger circuit 1244 shown in FIG. 11 as a variable resistor, this arrangement is capable of generating such a waveform.

Figure 12B:
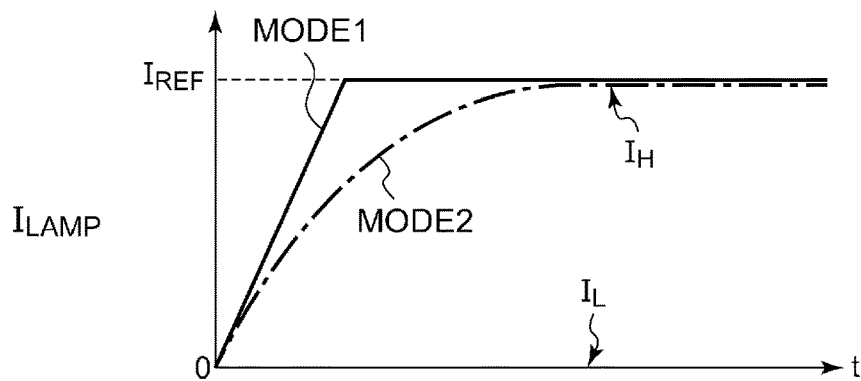
Figure 12C:
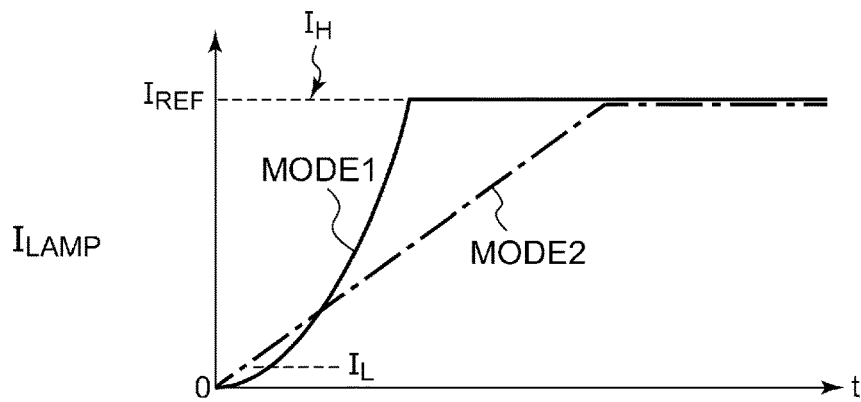

FIG. 12B shows an example in which the driving current $I_{LAMP}$ in the first mode is represented by a straight line, and the driving current $I_{LAMP}$ in the second mode is represented by a function having a curve that protrudes upward. Conversely, an arrangement may be made in which the driving current $I_{LAMP}$ in the first mode is represented by a non-linear function and the driving current $I_{LAMP}$ in the second mode is represented by a straight line. FIG. 12C shows an example in which the driving current $I_{LAMP}$ is represented by a function having a curve that protrudes downward in both the first mode and the second mode.

Figure 12D:
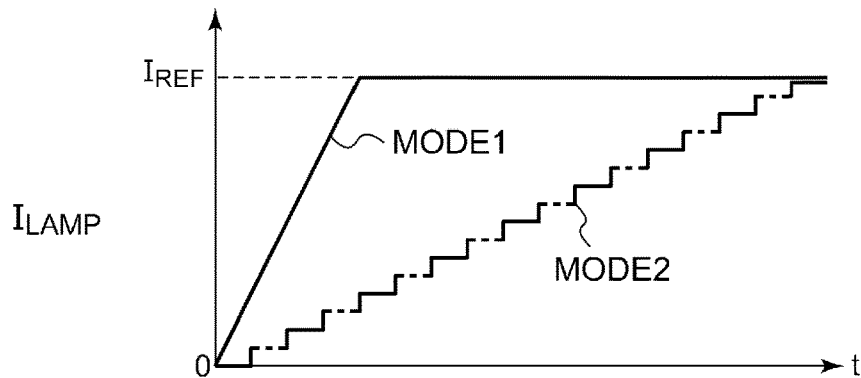

As shown in FIG. 12D, the driving current $I_{LAMP}$ may be changed in a stepwise manner in the second mode. In this case, the slope g'(t) may preferably be regarded as a slope that passes through the corner of each step. The waveform shown in FIG. 12D and other waveforms may be generated by means of a combination of a digital signal processing circuit and a D/A converter.

Figure 13:
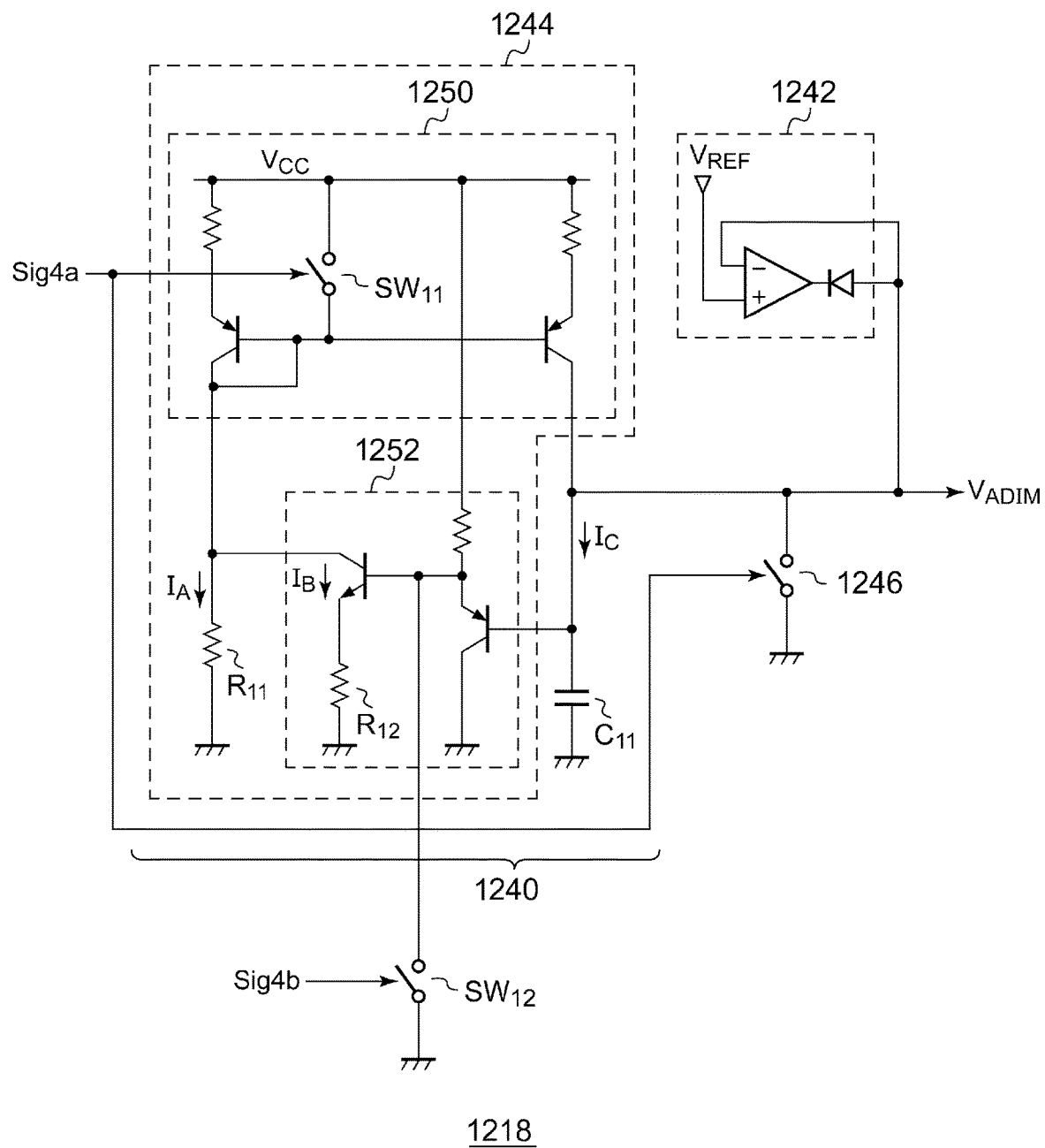
FIG. 13 is a circuit diagram showing an example configuration of a gradual-change lighting circuit.

FIG. 13 is a circuit diagram showing an example configuration of the gradual-change lighting circuit 1218. A control signal Sig4a is a signal configured as a lighting-on/lighting-off instruction. When the light is to be turned on, the control signal Sig4a is set to the low level. When the light is to be turned off, the control signal Sig4a is set to the high level. On the other hand, a control signal Sig4b is set to the low level in the first mode, and is set to the high level in the second mode.

The gradual-change lighting circuit 1218 further includes a discharging switch 1246 in addition to the time constant circuit 1240 and the voltage clamp circuit 1242. When the light is to be turned off, the discharging switch 1246 is set to the on state. This discharges the capacitor $C_{11}$, and accordingly, the analog dimming voltage $V_{ADIM}$ is fixedly set to 0 V.

The charger circuit 1244 of the time constant circuit 1240 includes a resistor $R_{11}$, a current mirror circuit 1250, and a current correction circuit 1252. The current mirror circuit 1250 mirrors a current $I_A$ that flows through the resistor $R_{11}$, and supplies the mirror current thus generated to the capacitor $C_{11}$. When the control signal Sig4a indicates the lighting-off instruction, the switch $SW_{11}$ turns off the current mirror circuit 1250.

The current correction circuit 1252 is configured to be switchable between the on state and the off state. In the on state, the current correction circuit 1252 supplies a current $I_B$ that is proportional to the voltage $V_{ADIM}$ across the capacitor $C_{11}$ to the input of the current mirror circuit 1250.

$$I_B = V_{ADIM}/R_{12}$$

The charging current supplied to the capacitor $C_{11}$ is proportional to $(I_A + I_B)$.

A switch $SW_{12}$ is provided in order to allow the current correction circuit 1252 to be switched between the on state and the off state. When the control signal Sig4b indicates the first mode, the switch $SW_{12}$ is turned off. In this case, the current correction circuit 1252 is set to the on state. In this state, the current correction circuit 1252 generates the current $I_B$. When the control signal Sig4b indicates the second mode, the switch $SW_{12}$ is turned on. In this case, the current correction circuit 1252 is set to the off state. In this state, the current $I_B$ becomes zero.

With the gradual-change lighting circuit 1218 shown in FIG. 13, this arrangement is capable of generating the analog dimming voltage $V_{ADIM}$ having a time constant (slope/gradient) that is changed according to the mode switching between the first mode and the second mode. Specifically, this arrangement provides the driving current $I_{LAMP}$ shown in FIG. 12C.

Figure 14:
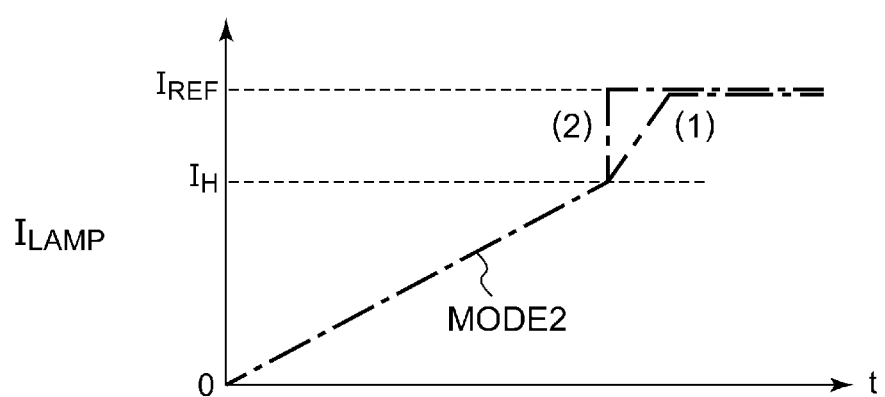
FIG. 14 is a waveform diagram showing a modification of the driving current $I_{LAMP}$ in the second mode in the start-up operation.

FIG. 14 is a waveform diagram showing a modification of the driving current $I_{LAMP}$ in the second mode in the start-up operation. In a case in which the second mode is employed in a maintenance operation or a test operation, in order to reduce the operation time, the driving current $I_{LAMP}$ preferably reaches the target value $I_{REF}$ in as short a time as possible after judgment is made by the abnormality detector 1140 regarding whether or not an abnormality has occurred. In order to satisfy such a need, the slope of the driving current $I_{LAMP}$ may be raised or otherwise the driving current $I_{LAMP}$ may be suddenly raised to the target value $I_{REF}$ after the driving current $I_{LAMP}$ exceeds a current $I_H$ based on which the abnormality detector 1140 can judge whether or not an abnormality has occurred in a sure manner.

Figure 15:
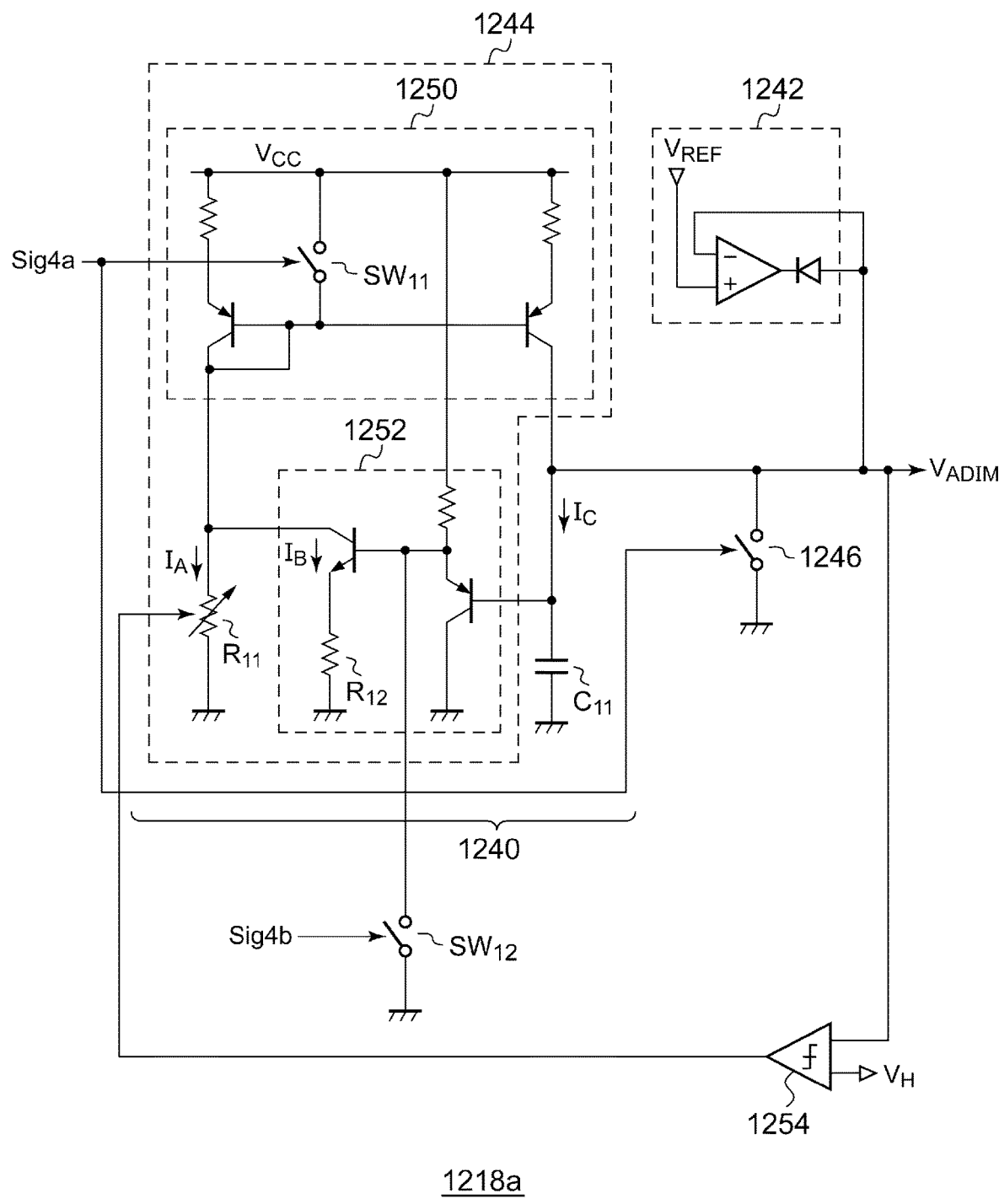
FIG. 15 is a circuit diagram showing a gradual-change lighting circuit that is capable of generating an analog dimming voltage $V_{ADIM}$ that corresponds to the driving current $I_{LAMP}$ shown in FIG. 14.

FIG. 15 is a circuit diagram showing a gradual-change lighting circuit 1218a that is capable of generating the analog dimming voltage $V_{ADIM}$ that corresponds to the driving current $I_{LAMP}$ shown in FIG. 14. The gradual-change lighting circuit 1218a further includes a comparator 1254 in addition to the gradual-change lighting circuit 1218 shown in FIG. 13. Furthermore, the resistor $R_{11}$ is configured as a variable resistor that is switchable between two resistance values. The comparator 1254 compares the analog dimming voltage $V_{ADIM}$ with a threshold voltage $V_H$ that defines the current $I_H$ shown in FIG. 14. When $V_{ADIM} < V_H$, the resistor $R_{11}$ provides a first resistance value which is a larger value. Conversely, when $V_{ADIM} > V_H$, the resistor $R_{11}$ provides a second resistance value which is a smaller value. With this arrangement, when $V_{ADIM} > V_H$, the current $I_A$ that flows through the resistor $R_{11}$ rises, which increases the charging current $I_C$ supplied to the capacitor $C_{11}$. This raises the charging rate, thereby raising the slope of the analog dimming voltage $V_{ADIM}$.

In FIG. 15, the resistor $R_{11}$ may be configured as a fixed resistor. In this case, when $V_{ADIM} > V_H$ holds true in the second mode, the current correction circuit 1252 may be forcibly turned on instead of switching the resistance value of the resistor $R_{11}$. Specifically, the circuit may preferably be modified such that, when $V_{ADIM} > V_H$ holds true in the second mode, the switch $SW_{12}$ is turned off.

In FIG. 13, the resistor $R_{11}$ may be configured as a variable resistor that is switchable between two resistance values. Also, in the first mode, the resistance value of the resistor $R_{11}$ may be set to a first value which is a smaller value. In the second mode, the resistance value of the resistor $R_{11}$ may be set to a second value which is a larger value.

Figure 16:
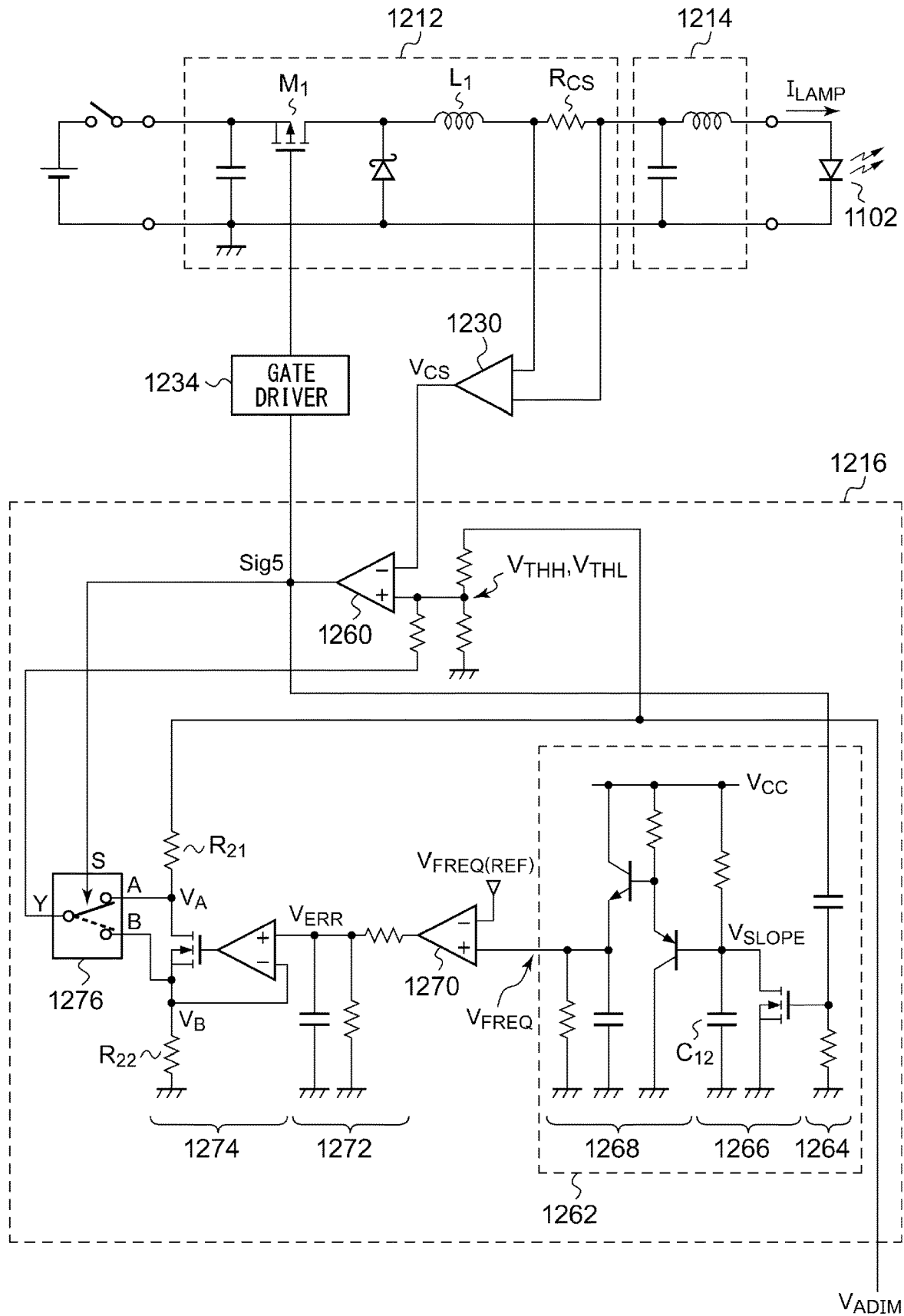
FIG. 16 is a circuit diagram showing an example configuration of a switching converter and a converter controller.

FIG. 16 is a circuit diagram showing an example configuration of the switching converter 1212 and the converter controller 1216. The converter controller 1216 is a controller configured to support a Bang-Bang control operation using a window comparator method.

The current detection circuit 1230 generates a current detection signal $V_{CS}$ having a superimposed ripple component corresponding to the switching operation of the switching transistor $M_1$. When the current detection signal $V_{CS}$ reaches an upper-side threshold value $V_{THH}$, the comparator 1260 switches the pulse signal Sig5 to the off level (low level). When the current detection signal $V_{CS}$ reaches a lower-side threshold value $V_{THL}$, the comparator 1260 switches the pulse signal Sig5 to the on level (high level).

The converter controller 1216 adjusts the voltage difference between the upper-side threshold value $V_{THH}$ and the lower-side threshold value $V_{THL}$ by means of a feedback control operation such that the frequency (switching frequency) of the pulse signal Sig5 approaches a predetermined target value.

The frequency detection circuit 1262 generates a frequency detection signal $V_{FREQ}$ that indicates the frequency of the pulse signal Sig5. The frequency detection circuit 1262 may include a high-pass filter 1264, a charging/discharging circuit 1266, and a peak hold circuit 1268. However, the configuration of the frequency detection circuit 1262 is not restricted in particular. The high-pass filter 1264 may be configured as a differentiating circuit, and detects a positive edge of the pulse signal Sig5. The charging/discharging circuit 1266 charges the capacitor $C_{12}$ so as to generate a slope signal $V_{SLOPE}$. Furthermore, the charging/discharging circuit 1266 discharges the capacitor $C_{12}$ for every positive edge (period) of the pulse signal Sig5, so as to reset the slope signal $V_{SLOPE}$. The slope signal $V_{SLOPE}$ thus obtained has a sawtooth waveform. As the period of the pulse signal Sig5 becomes longer, i.e., as the frequency becomes lower, the peak level becomes higher. The peak hold circuit 1268 holds the peak value of the slope signal $V_{SLOPE}$, so as to generate the frequency detection signal $V_{FREQ}$.

An error amplifier 1270 amplifies the difference between the frequency detection signal $V_{FREQ}$ and the reference signal $V_{FREQ(REF)}$ which indicates the target frequency, so as to generate an error signal $V_{ERR}$. The error signal $V_{ERR}$ is smoothed by a filter 1272.

A voltage source 1274 changes the voltage difference $\Delta V (=V_A - V_B)$ between the two voltages $V_A$ and $V_B$ according to the error signal $V_{ERR}$ while maintaining the average of the two voltages $V_A$ and $V_B$.

With the voltage source 1274, the relation $V_B = V_{ERR}$ holds true. The current that flows through the resistor $R_{22}$ is represented by $V_{ERR}/R_{22}$. Accordingly, $V_A$ is represented by $V_A = V_{ADIM} - R_{21} \times V_{ERR}/R_{22}$. Assuming that $R_{21} = R_{22}$ holds true, $V_A$ is represented by $V_A = V_{ADIM} - V_{ERR}$.

When the pulse signal Sig5 is set to the on level, a selector 1276 selects the upper-side voltage $V_A$. When the pulse signal Sig5 is set to the off level, the selector 1276 selects the lower-side voltage $V_B$. The output signal of the selector 1276 is superimposed on one input of the comparator 1260.

With the converter controller 1216, this arrangement has an advantage in employing the Bang-Bang control method, i.e., an advantage of high-speed responsivity. With an ordinary Bang-Bang control method, such an arrangement has a problem of fluctuation of the switching frequency. With the configuration shown in FIG. 16, this arrangement allows the switching frequency to be stabilized.

Description has been made regarding the present invention with reference to the embodiments using specific terms. However, the above-described embodiments show only the mechanisms and applications of the present invention for exemplary purposes only, and are by no means intended to be interpreted restrictively. Rather, various modifications and various changes in the layout can be made without departing from the spirit and scope of the present invention defined in appended claims.

The invention claimed is:

1. A load driving apparatus structured to receive an input voltage from a power supply, and to supply an electric power to a load under a control operation of a processor, wherein the processor outputs a first signal and a second signal in conjunction via a first pin and a second pin such that the first signal and the second signal are negated when the load is instructed to suspend an operation thereof, and wherein the load driving apparatus comprises:

an output circuit structured to supply an electric power to the load;
a protection switch provided on a driving path that extends from the power supply to the load and returns to the power supply; and
a control circuit structured to be set to an operation state when the first signal is asserted, to be set to a suspension state when the first signal is negated, to turn on the protection switch when the second signal is asserted, and to turn off the protection switch when the second signal is negated.

2. The load driving apparatus according to claim 1, wherein the output circuit comprises a transistor structured to adjust an electrical state of the load,
wherein the control circuit is structured to control the transistor such that the electrical state of the load approaches a target value when the first signal is asserted, and structured to turn off the transistor when the first signal is negated.

3. The load driving apparatus according to claim 2, wherein the output circuit is configured as a switching converter, and wherein the transistor is configured as a switching transistor.

4. The load driving apparatus according to claim 1, wherein the load comprises a light-emitting element structured to emit an excitation light and a fluorescent member structured to be excited by the excitation light and to emit a fluorescence light, and is structured to output a white output light having spectrum of the excitation light and the fluorescence light,
and wherein, when a light leakage abnormality is detected in the light source, the processor negates the first signal and the second signal.

5. The load driving apparatus according to claim 1, wherein at least one from among the first signal and the second signal is generated as a pulse signal in an asserted state, and is generated as a DC signal in a negated state.

6. An automotive lamp comprising:
a light source;
the load driving apparatus according to claim 1, structured to drive the light source; and
a processor structured to control the load driving apparatus.

7. A lighting circuit employed in an automotive lamp, the lighting circuit comprising:
a driving circuit structured to supply a driving current to a light-emitting element of a light source; and
an abnormality detector structured to detect an abnormality that can occur in the light source,
wherein the lighting circuit is structured to be switchable between a first mode in which the driving current is raised with a first slope when lighting is started up and a second mode in which the driving current is raised with a second slope that is smaller than the first slope when lighting is started up.

8. The lighting circuit according to claim 7, wherein a target value of the driving current in the second mode is substantially the same as the target value of the driving current in the first mode.

9. The lighting circuit according to claim 7, wherein the light source comprises:
a laser diode structured as a light-emitting element; and
a fluorescent member structured to be excited by an excitation light emitted from the laser diode, and to emit a fluorescence light, so as to generate a white output light including the excitation light and a fluorescence spectrum,
and wherein the abnormality detector detects an abnormality which is leakage of the excitation light.

10. The lighting circuit according to claim 7, wherein, when the automotive lamp is to be tested, the second mode is selected.

11. The lighting circuit according to claim 7, wherein, when a speed of a vehicle is lower than a predetermined threshold value, the second mode is selected.

12. An automotive lamp comprising:
a light source comprising a light-emitting element; and
the lighting circuit according to claim 7, structured to supply a driving current to the light-emitting element.

13. A lighting circuit employed in an automotive lamp, the lighting circuit comprising:
a driving circuit structured to supply a driving current to a light-emitting element of a light source; and
an abnormality detector structured to detect an abnormality that can occur in the light source,
wherein the lighting circuit is structured to be switchable between a first mode in which the driving current is raised up to a predetermined value in a first start-up time when lighting is started up and a second mode in which the driving current is raised up to the predetermined value in a second start-up time that is longer than the first start-up time when lighting is started up.

14. The lighting circuit according to claim 13, wherein the light-emitting element comprises a laser diode,
and wherein the predetermined value is determined to be higher than an oscillation threshold value of the laser diode.

\* \* \* \* \*